US012762263B2

(12) United States Patent
White et al.

(10) Patent No.: US 12,762,263 B2
(45) Date of Patent: Oct. 13, 2026

(54) COMPUTER-IMPLEMENTED VALIDATION METHODS AND SYSTEMS

(71) Applicant: BRITISH TELECOMMUNICATIONS PUBLIC LIMITED COMPANY, London (GB)

(72) Inventors: Catherine White, London (GB); Jonathan Roscoe, London (GB); Robert Hercock, London (GB); Ruth Wright, London (GB)

(*) Notice: Subject to any disclaimer, the term of this patent is extended or adjusted under 35 U.S.C. 154(b) by 165 days.

(21) Appl. No.: 18/694,858

(22) PCT Filed: Aug. 23, 2022

(86) PCT No.: PCT/EP2022/073434
§ 371 (c)(1),
(2) Date: Mar. 22, 2024

(87) PCT Pub. No.: WO2023/046390
PCT Pub. Date: Mar. 30, 2023

(65) Prior Publication Data

US 2024/0403468 A1 Dec. 5, 2024

(30) Foreign Application Priority Data

Sep. 24, 2021 (GB) ..................................... 2113636

(51) Int. Cl.
*G06F 21/62* (2013.01)

(52) U.S. Cl.
CPC ................................ *G06F 21/6218* (2013.01)

(58) Field of Classification Search
CPC ... G06F 21/6218; G06F 21/62; H04L 9/3271; H04L 9/3297; H04L 9/50; H04L 63/18;
(Continued)

(56) References Cited

U.S. PATENT DOCUMENTS 5,659,617 A 8/1997 Fischer
9,247,392 B2 1/2016 Raghupathy et al.
(Continued)

FOREIGN PATENT DOCUMENTS

EP 2656270 B1 4/2020
GB 2590487 A 6/2021
(Continued)

OTHER PUBLICATIONS

International Search Report and Written Opinion received for PCT Patent Application No. PCT/EP2022/073445, mailed on Dec. 22, 2022, 20 pages.
(Continued)

*Primary Examiner* — Quazi Farooqui
(74) *Attorney, Agent, or Firm* — EIP US LLP

(57) ABSTRACT

A beacon device transmits a challenge message to each of one or more responder devices over a respective direct communication link, inviting each responder device to prove the existence of its respective direct communication link by transmitting to a respective recipient device, distinct from the beacon device, a respective response message indicating knowledge of contents of the challenge message. A predetermined time period after its transmission of the challenge message, the beacon device transmits a confirmation message indicating knowledge of the contents of the challenge message to a message store. A validation device then compares contents of each response message which preceded the confirmation message in time, if any, to contents of the confirmation message and infers therefrom which of the respective responder devices, if any, received the challenge message over the respective direct communication link.

30 Claims, 6 Drawing Sheets

(58) Field of Classification Search
CPC . H04L 9/3215; H04L 9/3228; H04L 63/0876; H04L 9/3242; H04L 63/123; H04L 63/126; H04L 2463/121; H04W 12/63; H04W 12/104; H04W 12/06
See application file for complete search history.

(56) References Cited

U.S. PATENT DOCUMENTS

| | | | |
|---|---|---|---|
| 10,375,150 B2 | 8/2019 | Reddy et al. | |
| 2007/0201584 A1 | 8/2007 | Furman et al. | |
| 2008/0240270 A1* | 10/2008 | Coon | H04L 27/261 375/296 |
| 2010/0195552 A1* | 8/2010 | Ho | H04W 74/06 370/311 |
| 2014/0112227 A1 | 4/2014 | Hasegawa | |
| 2015/0063232 A1* | 3/2015 | Choi | H04W 4/70 370/329 |
| 2015/0373618 A1 | 12/2015 | Deenoo et al. | |
| 2015/0382171 A1 | 12/2015 | Roy et al. | |
| 2016/0078219 A1 | 3/2016 | Hernan | |
| 2016/0359623 A1 | 12/2016 | Unruh | |
| 2018/0103036 A1* | 4/2018 | Fox | H04L 63/304 |
| 2018/0351738 A1* | 12/2018 | Grice | G01S 19/256 |
| 2019/0090090 A1 | 3/2019 | Doyal et al. | |
| 2019/0132347 A1 | 5/2019 | Wakid | |
| 2020/0034876 A1* | 1/2020 | Soundararajan | H04L 9/3239 |
| 2020/0034886 A1 | 1/2020 | Willardsen | |
| 2020/0034888 A1 | 1/2020 | Soundararajan et al. | |
| 2020/0059784 A1 | 2/2020 | Batra et al. | |
| 2020/0120509 A1 | 4/2020 | Stitt et al. | |
| 2020/0162256 A1 | 5/2020 | Pourtabatabaie et al. | |
| 2020/0177391 A1 | 6/2020 | Qiu | |
| 2022/0408263 A1 | 12/2022 | Hoggat et al. | |
| 2023/0073457 A1* | 3/2023 | Dong | H04W 48/06 |
| 2023/0308877 A1* | 9/2023 | Morchon | H04L 9/3247 |
| 2024/0340648 A1 | 10/2024 | White et al. | |

FOREIGN PATENT DOCUMENTS

| | | |
|---|---|---|
| WO | 2015145169 A1 | 10/2015 |
| WO | 2021105683 A1 | 6/2021 |
| WO | 2021123376 A1 | 6/2021 |
| WO | 2021155903 A1 | 8/2021 |

OTHER PUBLICATIONS

International Search Report and Written Opinion received for PCT Patent Application No. PCT/EP2022/073434, mailed on Dec. 5, 2022, 23 pages.

Office Action received for Great Britain Patent Application No. 2113636.1, mailed on Jun. 29, 2022, 18 pages.

Office Action received for Great Britain Patent Application No. 2113637.9, mailed on Jun. 30, 2022, 15 pages.

Amoretti , et al., "Blockchain-based Proof of Location", arXiv:1607.00174v3, Feb. 24, 2020, 13 pages.

Avoine , et al., "Security of Distance-Bounding: A Survey", ACM Computing Surveys, vol. 51, No. 5, Article 94, Sep. 2018, 33 pages.

García-Magariño , et al., "Security in Networks of Unmanned Aerial Vehicles for Surveillance with an Agent-based Approach Inspired by the Principles of Blockchain", Ad Hoc Networks, vol. 86, Apr. 1, 2019, pp. 72-82.

Halevi , et al., "Context-Aware Defenses to RFID Unauthorized Reading and Relay Attacks", IEEE Transactions on Emerging Topics in Computing, vol. 1, No. 2, Dec. 2013, pp. 307-318.

Javali , et al., "I Am Alice, I Was in Wonderland: Secure Location Proof Generation and Verification Protocol", IEEE 41st Conference on Local Computer Networks (LCN), Dubai, United Arab Emirates, 2016, pp. 477-485.

Li , et al., "Privacy-preserving Location Proof for Securing Large-scale Database-driven Cognitive Radio Networks", IEEE Internet of Things Journal, vol. 3, No. 4, 2015, pp. 1-9.

Nosouhi , et al., "Blockchain for Secure Location Verification", Journal of Parallel and Distributed Computing, vol. 136, Feb. 2020, pp. 40-51.

Oluwatimi , et al., "A Context-aware System to Secure Enterprise Content: Incorporating Reliability Specifiers", Computers & Security, vol. 77, 2018, pp. 162-178.

Stajano , et al., "Multichannel Protocols to Prevent Relay Attacks", Proceedings of Financial Cryptography, 2010, pp. 4-19.

Trouw, et al., "The XY Oracle Network: The Proof-of-Origin Based Cryptographic Location Network", Jan. 2018, 20 pages.

Urien , et al., "Elliptic Curve-based RFID/NFC Authentication with Temperature Sensor Input for Relay Attacks", Decision Support Systems, vol. 59, Mar. 2014, pp. 28-36.

Wurr , et al., "Stigmergic Navigation for Multi-Agent Teams in Complex Environments", Chapter-4, Stigmergic Optimization, vol. 31, 2006, 34 pages.

Reyzin, Leonid, "Wyner's Wir•Tap Channel, Forty Years Later", Presentation on the Wire-Tap Channel, Boston University, 2015, 107 pages.

Xiong, Jie , "Pushing the Limits of Indoor Localization in Today's Wi-fi Networks", Doctoral Thesis, University College London, Aug. 2015, 126 pages.

"Foam Whitepaper", Foamspace Corp, Available online at <https://foam.space/publicAssets/FOAM_Whitepaper.pdf>, Jan. 5, 2018, pp. 1-23.

* cited by examiner

COMPUTER-IMPLEMENTED VALIDATION METHODS AND SYSTEMS

PRIORITY CLAIM

The present application is a National Phase entry of PCT Application No. PCT/EP2022/073434, filed Aug. 23, 2022, which claims priority from GB Application No. 2113636.1 filed Sep. 24, 2021, each of which hereby fully incorporated herein by reference.

TECHNICAL FIELD

The present disclosure relates to validation methods.

More specifically, aspects relate to computer-implemented methods, data processing systems configured to perform such computer-implemented methods, computer programs comprising instructions which, when the programs are executed by a computer, cause the computer to carry out such computer-implemented methods, computer-readable data carriers having stored thereon such computer programs and data carrier signals carrying such computer programs.

BACKGROUND

Proof of the presence of a usable direct communication channel between two communication devices can be used both as a precursor to establishing communication between those devices and for other purposes, such as establishing their relative location. For example, radio broadcast signals are used to advertise the presence of cellular base stations to mobile devices in the vicinity. The location of a mobile device can be established as being within a cell served by such a base station if the mobile device responds to such a broadcast signal.

It is desirable to provide improved methods involving proving the presence of usable direct communication channels.

SUMMARY

According to a first aspect, there is provided a computer-implemented method comprising, following transmission of a challenge message by a beacon device to each of one or more responder devices over a respective direct communication link which invites the responder devices to each transmit to a respective recipient device, distinct from the beacon device, a respective response message indicating knowledge of contents of the challenge message; a validation device: obtaining an indication that a confirmation message from the beacon device has been received by a message store, the confirmation message indicating knowledge of the contents of the challenge message and having been transmitted by the beacon device a predetermined time period after its transmission of the challenge message; responsive thereto, comparing contents of each response message which preceded the confirmation message in time, if any, to contents of the confirmation message and inferring therefrom which of the respective responder devices, if any, received the challenge message over the respective direct communication link.

The computer-implemented method can further comprise the validation device inferring data relating to location, relative to the beacon device at a time the challenge message was issued, of each responder device inferred to have received the challenge message over the respective direct communication link.

One of the responder devices can be co-located with a quantum key distribution (QKD) link terminal or QKD trusted node; the computer-implemented method can further comprise the validation device authenticating that responder device for participation in QKD based on the inferred data relating to the location of that responder device relative to the beacon device.

The beacon device can comprise directional transmission means and can be configured to transmit the challenge message in a first predetermined direction then, before submitting the confirmation message to the message store, can be further configured to transmit one or more directed repetitions of the challenge message in one or more respective further predetermined directions; the computer-implemented method can further comprise the validation device inferring the data relating to the location of each of the one or more responder devices from timings of each response message with respect to times the challenge message and the directed repetitions of the challenge message were transmitted.

The challenge message and the directed repetitions of the challenge message can be transmitted according to a predetermined temporal and directional pattern;

the computer-implemented method can further comprise the validation device: repeating the computer-implemented method described in the preceding paragraph on one or more subsequent occasions, wherein both contents of the challenge message and the predetermined temporal and directional pattern are varied between occasions; then inferring whether responder devices local to one another have shared data to gain an unfair advantage.

Each response message can comprise data intended for the respective recipient device and originating from a respective sender device distinct from the respective responder device; the computer-implemented method can further comprise the validation device validating the data originating from the respective sender device as having been routed via a respective responder device local to the beacon device.

The computer-implemented method can further comprise the validation device generating an external device challenge message portion and transmitting it to the beacon device to cause the beacon device to generate a beacon device challenge message portion and construct the challenge message contents as a non-separable function of two or more variables, the external device challenge message portion and the beacon device challenge message portion can each comprise at least one of said variables.

The challenge message can indicate a problem for the responder devices to solve, each response message can indicate a respective responder device solution to the problem and the confirmation message can indicate one of the problem and a beacon device solution to the problem; wherein inferring which of the respective responder devices, if any, received the challenge message over the respective direct communication link can comprise determining whether each responder device solution is a correct solution to the problem.

The message store can be a distributed ledger; the validation device can be one of a plurality of peers which can participate in building the distributed ledger; and the confirmation message can indicate the problem; the computer-implemented method can further comprise the validation device: determining that none of the responder devices received the challenge message over the respective direct communication link; and responsive thereto, solving the problem and submitting a resulting validation device solution to the distributed ledger.

The message store can be a distributed ledger; and the validation device can be one of a plurality of peers which can participate in building the distributed ledger; the computer-implemented method can further comprise the validation device participating in adding an entry to the distributed ledger in respect of only a first solution to the problem submitted to the distributed ledger.

The challenge message can be transmitted at a first predetermined signal-to-noise ratio (SNR); and between transmitting the challenge message and the confirmation message, the beacon device can be configured to transmit one or more SNR-incremented repetitions of the challenge message at successively higher SNRs;

the computer-implemented method can further comprise the validation device inferring data relating to the respective direct communication links from timing of each response message with respect to times the challenge message and the SNR-incremented repetitions of the challenge message were transmitted.

The computer-implemented method can further comprise the validation device authenticating the one or more responder devices for two-way communication with the beacon device in dependence on timings of the respective response messages.

Authenticating the one or more responder devices for two-way communication with the beacon device can in dependence on timings of the respective response messages can comprise authenticating a responder device whose response message was earliest and denying authentication of any other responder devices.

Authenticating the one or more responder devices for two-way communication with the beacon device in dependence on timings of the respective response messages can comprise authenticating any responder device whose response message beat a cut-off time and denying authentication of any other responder devices.

The beacon device can be a network node and authenticating the one or more responder devices for two-way communication with the beacon device in dependence on timings of the respective response messages can comprise authenticating the one or more responder devices for network access via the network node.

According to a second aspect there is provided a computer-implemented method comprising a beacon device: transmitting a challenge message to each of one or more responder devices over a respective direct communication link, to invite the responder devices to each transmit to a respective recipient device, distinct from the beacon device, a respective response message indicating knowledge of contents of the challenge message; and a predetermined time period after transmission of the challenge message, transmitting a confirmation message to a message store, the confirmation message indicating knowledge of the contents of the challenge message such that a validation device can compare contents of each response message which preceded the confirmation message in time to contents of the confirmation message and infer therefrom which of the respective responder devices, if any, received the challenge message over the respective direct communication link.

The computer-implemented method can further comprise the beacon device: receiving, from a device external to the beacon device, an external device challenge message portion; responsive thereto, generating a beacon device challenge message portion; and responsive thereto, constructing the challenge message as a non-separable function of two or more variables, the external device challenge message portion and the beacon device challenge message portion can each comprise at least one of said variables; wherein transmitting the challenge message can be responsive to constructing the challenge message.

The challenge message can indicate a problem for the responder devices to solve and the confirmation message can indicate one of the problem and a beacon device solution to the problem.

The computer-implemented method can further comprise the beacon device: determining the time period based on a predicted solving duration for a target solving device; or constructing the challenge message so that the problem has a predicted solving duration for a target solving device based on the predetermined time period.

Data in the challenge message indicating the problem can comprise one or more codes constructed such that a predetermined threshold signal-to-noise ratio (SNR) is required at a responder device for it to successfully decode them.

Data in the challenge message indicating the problem can comprise one or more codes constructed such that they are computationally harder to decode the greater the error rate in the challenge message when received.

The problem can comprise determination of a salt which, when combined with a specified input string via a specified cryptographic hash function, produces an output string comprising a specified string.

The problem can be dependent on a responder device identifier such that each response message indicates a different responder device solution.

The computer-implemented method can further comprise the beacon device constructing the confirmation message such that an outer problem must be solved to obtain the problem from it.

Transmitting the challenge message can comprise transmitting a plurality of temporally-separated challenge message fractions, constructed such that all of the challenge message fractions must be received in order to obtain the problem.

The direct communication links can be radio communication links and transmitting the challenge message can comprise encoding the challenge message on one or more radio transmissions.

The beacon device can comprise directional transmission means and transmitting the challenge message can comprise transmitting the challenge message in a first predetermined direction; the computer-implemented method can further comprise, before transmitting the confirmation message to the message store, transmitting one or more directed repetitions of the challenge message in one or more respective further predetermined directions such that data relating to the location of each of the responder devices can be inferred from timings of each response message with respect to times the challenge message and the directed repetitions of the challenge message were transmitted.

The challenge message and the directed repetitions of the challenge message can be transmitted according to a predetermined temporal and directional pattern; the computer-implemented method can further comprise repeating the method of the preceding paragraph on one or more subsequent occasions, with contents of the challenge message being varied between occasions, wherein the predetermined temporal and directional pattern can be varied between occasions such that any sharing of solutions between responder devices local to one another can be inferred.

The direct communication links can be optical fiber communication links and transmitting the challenge message can comprise encoding the challenge message on an optical signal.

There can be a plurality of responder devices and transmitting the challenge message can comprise: encoding the challenge message as a series of qubits or qudits, each qubit or qudit of the series being a weak coherent optical pulse or a single photon; stochastically directing each qubit or qudit of the series to a respective one of the responder devices; and repeating transmission of the series of qubits or qudits in this way, such that responder devices can decode the complete challenge message after multiple repetitions.

Transmitting the challenge message can comprise adding noise to a signal carrying the challenge message.

The challenge message can be transmitted at a first predetermined signal-to-noise ratio (SNR); and the computer-implemented method can further comprise the beacon device, between transmitting the challenge message and the confirmation message, transmitting one or more SNR-incremented repetitions of the challenge message at successively higher SNRs, such that data relating to the respective direct communication links can be inferred from timings of each response message with respect to times the challenge message and the SNR-incremented repetitions of the challenge message were transmitted.

The computer-implemented method can further comprise the beacon device: prior to or at the same time as transmitting the challenge message, providing some but not all of the responder devices with an information advantage to assist with solving the problem.

The computer-implemented method can further comprise the beacon device: either engaging in or eschewing subsequent two-way communication with each of the one or more responder devices over the respective direct communication link, in dependence on the existence and timing of a respective response message.

Engaging in or eschewing subsequent two-way communication with each of the one or more responder devices can comprise engaging in subsequent two-way communication with a responder device whose response message was earliest and eschewing subsequent two-way communication with other responder devices.

Engaging in or eschewing subsequent two-way communication with each of the one or more responder devices can comprise engaging in subsequent two-way communication with any responder device whose response message beat a cut-off time and eschewing subsequent two-way communication with other responder devices.

The beacon device can be a network node and either engaging in or eschewing subsequent two-way communication with each of the one or more responder devices can comprise respectively providing or denying network access to each of the one or more responder devices.

According to a third aspect there is provided a computer-implemented method comprising a responder device: receiving data originating from a sender device intended for a recipient device; receiving a challenge message from a beacon device over a direct communication link; and transmitting a response message to the recipient device, the response message comprising the data received from the sender device and indicating knowledge of contents of the challenge message such that the responder device can be validated as being local to the beacon device by comparing contents of the response message to contents of a confirmation message indicating knowledge of the contents of the challenge message, the confirmation message having been transmitted by the beacon device to a message store a predetermined time period after transmission of the challenge message.

The challenge message can comprise a beacon device problem portion, the computer-implemented method further comprising the responder device: receiving, from a device external to the beacon device, over a direct communication link, an external device problem portion message comprising an external device problem portion; solving a problem constructed as a non-separable function of two or more variables, the external device problem portion and the beacon device problem portion each comprising at least one of said variables; and constructing the response message to comprise a solution to the problem, wherein transmitting the response message can be responsive thereto, such that the responder device can be validated as being local to both the beacon device and the external device by comparing contents of the response message to contents of the confirmation message transmitted by the beacon device and a further confirmation message transmitted by the external device indicating knowledge of the external device problem portion, the further confirmation message having been transmitted by the external device to a message store a predetermined time period after transmission of the external device problem portion message.

According to a fourth aspect there is provided a computer-implemented method comprising a responder device: receiving a challenge message comprising a beacon device problem portion from a beacon device over a direct communication link; receiving, from a device external to the beacon device, over a direct communication link, an external device problem portion message comprising an external device problem portion; solving a problem constructed as a non-separable function of two or more variables, the external device problem portion and the beacon device problem portion each comprising at least one of said variables; and transmitting a response message comprising a solution to the problem, such that the responder device can be validated as having direct communication links with both the beacon device and the external device by comparing contents of the response message to contents of: a confirmation message transmitted by the beacon device indicating knowledge of the contents of the challenge message, the confirmation message having been transmitted by the beacon device to a message store a predetermined time period after transmission of the challenge message; and a further confirmation message transmitted by the external device indicating knowledge of the external device problem portion, the further confirmation message having been transmitted by the external device to a message store a predetermined time period after transmission of the external device problem portion message.

According to a fifth aspect there is provided a computer-implemented method comprising a beacon device: transmitting a challenge message to each of one or more responder devices over a respective direct communication link, to invite the responder devices to each transmit a respective response message indicating knowledge of contents of the challenge message; and either engaging in or eschewing subsequent two-way communication with each of the one or more responder devices over the respective direct communication link, in dependence on the existence and timing of a respective response message.

Engaging in or eschewing subsequent two-way communication with each of the one or more responder devices can comprise engaging in subsequent two-way communication with a responder device whose response message was earliest and eschewing subsequent two-way communication with other responder devices.

Engaging in or eschewing subsequent two-way communication with each of the one or more responder devices can comprise engaging in subsequent two-way communication with any responder device whose response message beat a cut-off time and eschewing subsequent two-way communication with other responder devices.

The beacon device can be a network node and either engaging in or eschewing subsequent two-way communication with each of the one or more responder devices can comprise respectively providing or denying network access to each of the one or more responder devices.

The challenge message can invite each responder device to transmit its respective response message to a respective recipient device, distinct from the beacon device, the computer-implemented method can further comprise the beacon device: a predetermined time period after transmission of the challenge message, transmitting a confirmation message to a message store, the confirmation message indicating knowledge of the contents of the challenge message, such that a validation device can compare contents of each response message which preceded the confirmation message in time, if any, to contents of the confirmation message and infer therefrom which of the respective responder devices, if any, received the challenge message over the respective direct communication link; wherein: either engaging in or eschewing subsequent two-way communication with each of the one or more responder devices is in dependence on when their respective response messages were received by their respective recipient devices.

The computer-implemented method can further comprise the beacon device: receiving, from a device external to the beacon device, an external device challenge message portion; responsive thereto, generating a beacon device challenge message portion; and responsive thereto, constructing the challenge message from the external device challenge message portion and the beacon device challenge message portion; wherein transmitting the challenge message can be responsive to constructing the challenge message.

The challenge message can indicate a problem for the responder devices to solve and either engaging in or eschewing subsequent two-way communication with each of the one or more responder devices can be further in dependence on whether the respective response message comprises a correct solution to the problem.

The computer-implemented method can further comprise the beacon device: determining the time period based on a predicted solving duration for a target solving device; or constructing the challenge message so that the problem has a predicted solving duration for a target solving device based on the predetermined time period.

Data in the challenge message indicating the problem can comprise one or more codes constructed such that a predetermined threshold signal-to-noise ratio (SNR) is required at a responder device for it to successfully decode them.

Data in the challenge message indicating the problem can comprise one or more codes constructed such that they are computationally harder to decode the greater the error rate in the challenge message when received.

The problem can comprise determination of a salt which, when combined with a specified input string via a specified cryptographic hash function, produces an output string comprising a specified string.

The problem can be dependent on a responder device identifier such that each response message indicates a different responder device solution.

The computer-implemented method can further comprise the beacon device constructing the confirmation message such that an outer problem must be solved to obtain the problem from it.

Transmitting the challenge message can comprise transmitting a plurality of temporally-separated challenge message fractions, constructed such that all of the challenge message fractions must be received in order to obtain the problem.

The direct communication links can be radio communication links and transmitting the challenge message can comprise encoding the challenge message on one or more radio transmissions.

The beacon device can comprise directional transmission means and transmitting the challenge message can comprise transmitting the challenge message in a first predetermined direction; the computer-implemented method can further comprise, before transmitting the confirmation message to the message store, transmitting one or more directed repetitions of the challenge message in one or more respective further predetermined directions such that data relating to the location of each of the responder devices can be inferred from timings of each response message with respect to times the challenge message and the directed repetitions of the challenge message were transmitted.

The challenge message and the directed repetitions of the challenge message can be transmitted according to a predetermined temporal and directional pattern; the computer-implemented method can further comprise repeating the method of the preceding paragraph on one or more subsequent occasions, with contents of the challenge message being varied between occasions, wherein the predetermined temporal and directional pattern is varied between occasions such that any sharing of solutions between responder devices local to one another can be inferred.

The direct communication links can be optical fiber communication links and transmitting the challenge message can comprise encoding the challenge message on an optical signal.

There can be a plurality of responder devices and transmitting the challenge message can comprise: encoding the challenge message as a series of qubits or qudits, each qubit or qudit of the series being a weak coherent optical pulse or a single photon; stochastically directing each qubit or qudit of the series to a respective one of the plurality of responder devices; and repeating transmission of the series of qubits or qudits in this way, such that responder devices can decode the complete challenge message after multiple repetitions.

Transmitting the challenge message can comprise adding noise to a signal carrying the challenge message.

The challenge message can be transmitted at a first predetermined signal-to-noise ratio (SNR); and the computer-implemented method can further comprise the beacon device, between transmitting the challenge message and the confirmation message, transmitting one or more SNR-incremented repetitions of the challenge message at successively higher SNRs, such that data relating to the respective direct communication links can be inferred from timings of each response message with respect to times the challenge message and the SNR-incremented repetitions of the challenge message were transmitted.

The computer-implemented method can further comprise the beacon device: prior to or at the same time as transmitting the challenge message, providing some but not all of the responder devices with an information advantage to assist with solving the problem.

According to a sixth aspect there is provided a data processing system configured to perform the computer-implemented method of any of the first to fifth aspects.

According to a seventh aspect there is provided a computer program comprising instructions which, when the program is executed by a computer, cause the computer to carry out the computer-implemented method of any of the first to fifth aspects.

According to an eighth aspect there is provided a computer-readable data carrier having stored thereon the computer program of the seventh aspect.

According to a ninth aspect there is provided a data carrier signal carrying the computer program of the seventh aspect.

BRIEF DESCRIPTION OF THE FIGURES

Aspects of the present disclosure will now be described by way of example with reference to the accompanying figures. In the figures.

DETAILED DESCRIPTION OF THE FIGURES

The following description is presented to enable any person skilled in the art to make and use the systems and/or perform the methods of the disclosure, and is provided in the context of a particular application. Various modifications to the disclosed embodiments will be readily apparent to those skilled in the art.

System Context

Figure 1:
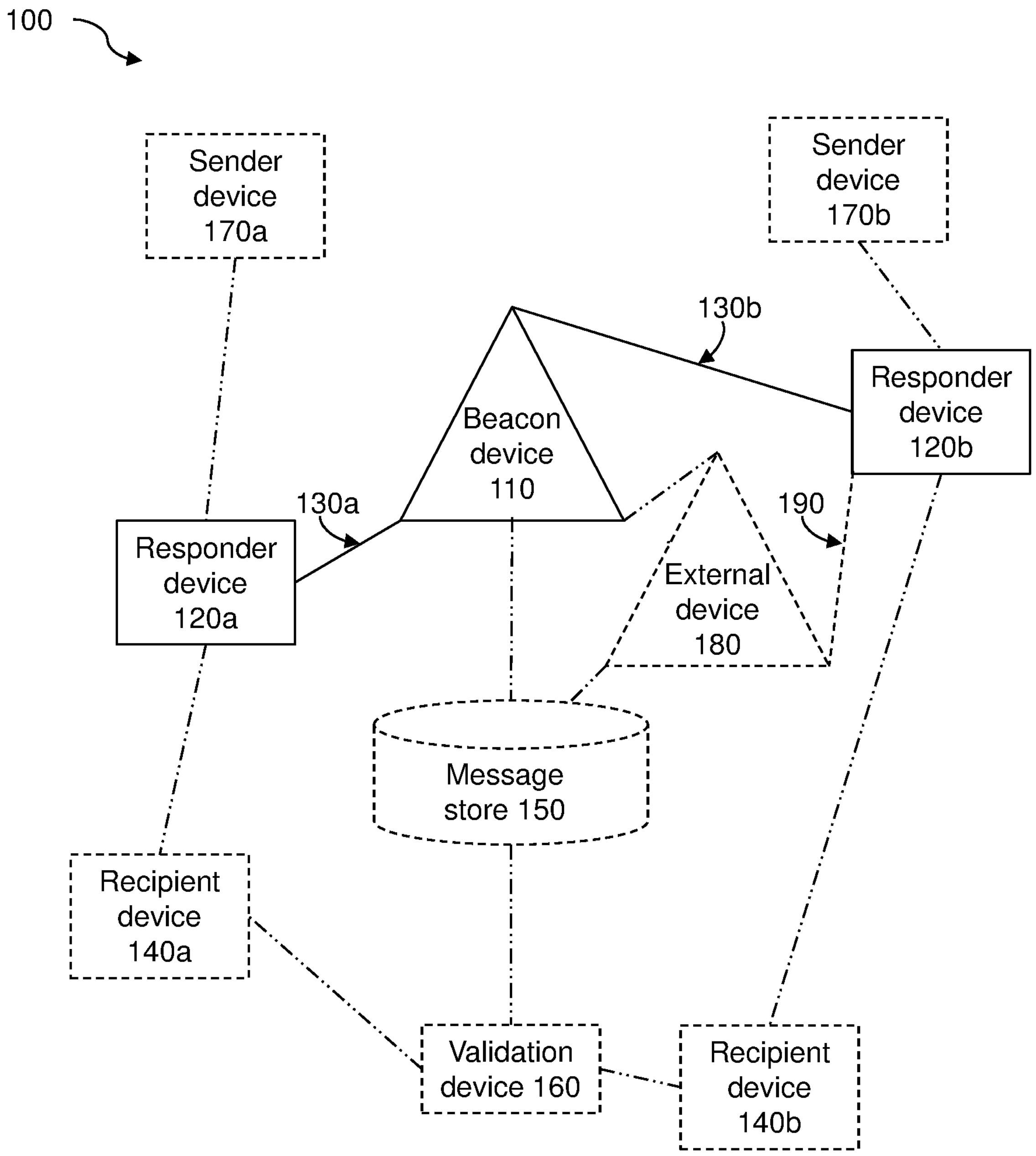
FIG. 1 schematically illustrates an example system.

FIG. 1 schematically illustrates a system 100 in which the methods described herein can be used. A beacon device 110 is capable of communicating with one or more responder devices 120*a*, 120*b* over one or more respective direct communication links 130*a*, 130*b*. The direct communication links 130*a*, 130*b* may for example be radio channels, optical fibers, or electrical transmission lines. These communication links 130*a*, 130*b* are "direct" in the sense that they comprise a single physical communication link with no amplifying or regenerating relay devices intermediate the beacon device 110 and the respective responder device 120*a*, 120*b*; no receivers or transmitters are used to communicate from the beacon device 110 to a responder device 120*a*, 120*b* over a respective direct communication link 130*a*, 130*b* save a transmitter of the beacon device 110 and a receiver of the respective responder device 120*a*, 120*b*. (The direct communication links 130*a*, 130*b* may however in some implementations comprise one or more passive components such as mirrors and/or filters.)

The beacon device 110 is configured to transmit a challenge message to each of the one or more responder devices 120*a*, 120*b* over the one or more respective direct communication links 130*a*, 130*b*.

For example, if the direct communication links 130*a*, 130*b* are radio channels then the beacon device 110 could transmit the challenge message via a radio transmitter, for example as a radio broadcast or multicast (or unicast, if only one responder device 120 is present), on a frequency which radio receivers of the one or more responder devices 120*a*, 120*b* are configured to receive. Short-range radio technologies such as Bluetooth™ or Very High Frequency (VHF) could for example be used.

As another example, if the direct communication links 130*a*, 130*b* are optical fibers then the beacon device 110 could transmit the challenge message via one or more optical transmitters, such as lasers, at a frequency which optical receivers of the one or more responder devices 120*a*, 120*b* are configured to receive. If a single optical transmitter is used then the optical signal on which the challenge message is encoded could for example be directed along multiple optical fibers 130*a*, 130*b*, in order to reach a plurality of responder devices 120*a*, 120*b*, using one or more beam splitters. In some implementations it may be useful for such beam splitters to be variable beam splitters tuned to compensate for differences in quality on the various direct communication links 130*a*, 130*b*.

In some optical examples, the challenge message could be transmitted using quantum optics as a series of qubits or higher dimensional qudits encoded on weak coherent optical pulses or single photons. (An optical source is generally considered to be 'weak' if it produces an average of one photon or less per pulse. Weak coherent optical sources are often attenuated lasers.) If a single quantum optical transmitter is used then the pulses or photons could be stochastically directed along multiple optical fibers 130*a*, 130*b*, in order to reach a respective plurality of responder devices 120*a*, 120*b*, for example using one or more beam splitters (which could optionally be variable beam splitters as described above). Since a single transmission of the challenge message in this way would result in each responder device 120*a*, 120*b* receiving only a substantially random subset of the qubits or qudits in the series, transmission of the challenge message could be repeated one or more times such that, following a number of repetitions, it is statistically likely that at least one of the one or more responder devices 120*a*, 120*b* has received the complete series of qubits or qudits.

The challenge message can comprise a message authentication code to enable the responder devices 120*a*, 120*b* to verify the integrity of the challenge message contents and to authenticate its origin. The challenge message can optionally be transmitted with a forward error correction protocol that allows recovery of an exact message authentication code if there are errors in the transmission. The message authentication code may optionally be transmitted with a higher degree of error correction than the rest of the challenge message, which on a noisy channel may enable the message authentication code to be obtained before the rest of the challenge message.

Delayed Confirmation Validation

One way in which the system 100 of FIG. 1 can be used is to validate the existence of the direct communication links 130*a*, 130*b*. For example, the challenge message could invite the responder devices 120*a*, 120*b* to prove the existence of their respective direct communication links 130*a*, 130*b* by responding to the challenge message with a respective response message indicating knowledge of contents of the challenge message. Such response messages can for example be transmitted to respective recipient devices 140*a*, 140*b*. Each response message can for example be digitally signed to authenticate the respective responder device 120's identity.

Communication between the responder devices 120*a*, 120*b* and the respective recipient devices 140*a*, 140*b* could be via respective direct or indirect communication links. Communication over indirect communication links can for example comprise transmission via a telecommunications network e.g. a wide area network (WAN) such as the Internet.

The beacon device 110 could wait a predetermined time period from transmission of the challenge message, then transmit to a message store 150 a confirmation message indicating knowledge of the contents of the challenge message. The message store 150 could be at a single location, for example a server computer, could be distributed for example between a plurality of cloud servers or redundantly copied for example across a plurality of distributed ledger network nodes. A validation device 160 communicably coupled to the message store 150 and each of the recipient devices 140*a*, 140*b* can then compare contents of each response message which preceded the confirmation message in time, if any, to contents of the confirmation message. Based on a result of this/these comparison/s, the validation device 160 can infer which of the responder devices 120*a*, 120*b*, if any, received the challenge message over their respective direct communication link 130*a*, 130*b*.

The confirmation message's route from the beacon device 110 to the message store 150 could exclude the responder devices 120*a*, 120*b*. This prevents the responder devices 120*a*, 120*b* from tampering with the confirmation message to ensure it matches their respective responses.

The delay between transmission of the challenge message and transmission of the confirmation message can be short enough to prevent responder devices 120*a*, 120*b* from enlisting assistance in responding to the challenge message from other devices (such as remote servers), or helping devices that do not have a direct communication link 130 with the beacon device 110 from fraudulently claiming they do. The predetermined time period between transmission of the challenge and confirmation messages could therefore for example be determined to be less than an average round trip ping time from the beacon device 110 to a predetermined set of Internet servers. Additional time may be factored in depending on the complexity of the challenge as will be described below. The predetermined time period could for example be anything from 10 seconds to 10 minutes.

Communication between the message store 150 and the validation device 160 could be via a direct or an indirect communication link. The validation device 160 can for example be a server computer. The message store 150 could for example be located on such a server computer, in which case the communication link between the message store 150 and the validation device 160 could comprise an internal communication bus, or some or all of the hardware required to implement the functions of the message store 150 and the validation device 160 could be shared between them, with their roles being defined by software. If the message store 150 is a distributed ledger then the validation device 160 could be a node of the distributed ledger network.

Communication between each of the recipient devices 140*a*, 140*b* and the validation device 160 could be via a respective direct or an indirect communication link. The validation device 160 can for example be a server computer. One or more of the recipient devices 140*a*, 140*b* could for example be located on such a server computer, in which case the respective communication links between such recipient devices 140*a*, 140*b* and the validation device 160 could comprise an internal communication bus, or some or all of the hardware required to implement the functions of the recipient devices 140*a*, 140*b* and the validation device 160 could be shared between them, with their roles being defined by software.

In some implementations a single device could act as the one or more recipient devices 140*a*, 140*b*, the message store 150 and the validation device 160. For example, in one such implementation the message store 150 is a distributed ledger and the validation device 160 and recipient devices 140*a*, 140*b* are all a server computer which is a node of the distributed ledger network.

The third-party verification provided by the validation device 160 reduces resource usage at the beacon device 110, for example storage capacity and electrical power, relative to schemes in which responses to a challenge message are directed to the device issuing the challenge message. The trust required of the beacon device 110 is also reduced.

The trust required of the beacon device 110 is reduced further in implementations where the beacon device 110 is excluded from the transmission path from each responder device 120*a*, 120*b* to the respective recipient device 140*a*, 140*b*. In implementations where the beacon device 110 is included in the respective transmission path from one or more of the responder devices 120*a*, 120*b* to the respective recipient device 140*a*, 140*b*, the trust required of the beacon device 110 can be reduced if the response message is locked in some way to prevent it being tampered with in transit, for example using a cryptographic signature.

Figure 2:
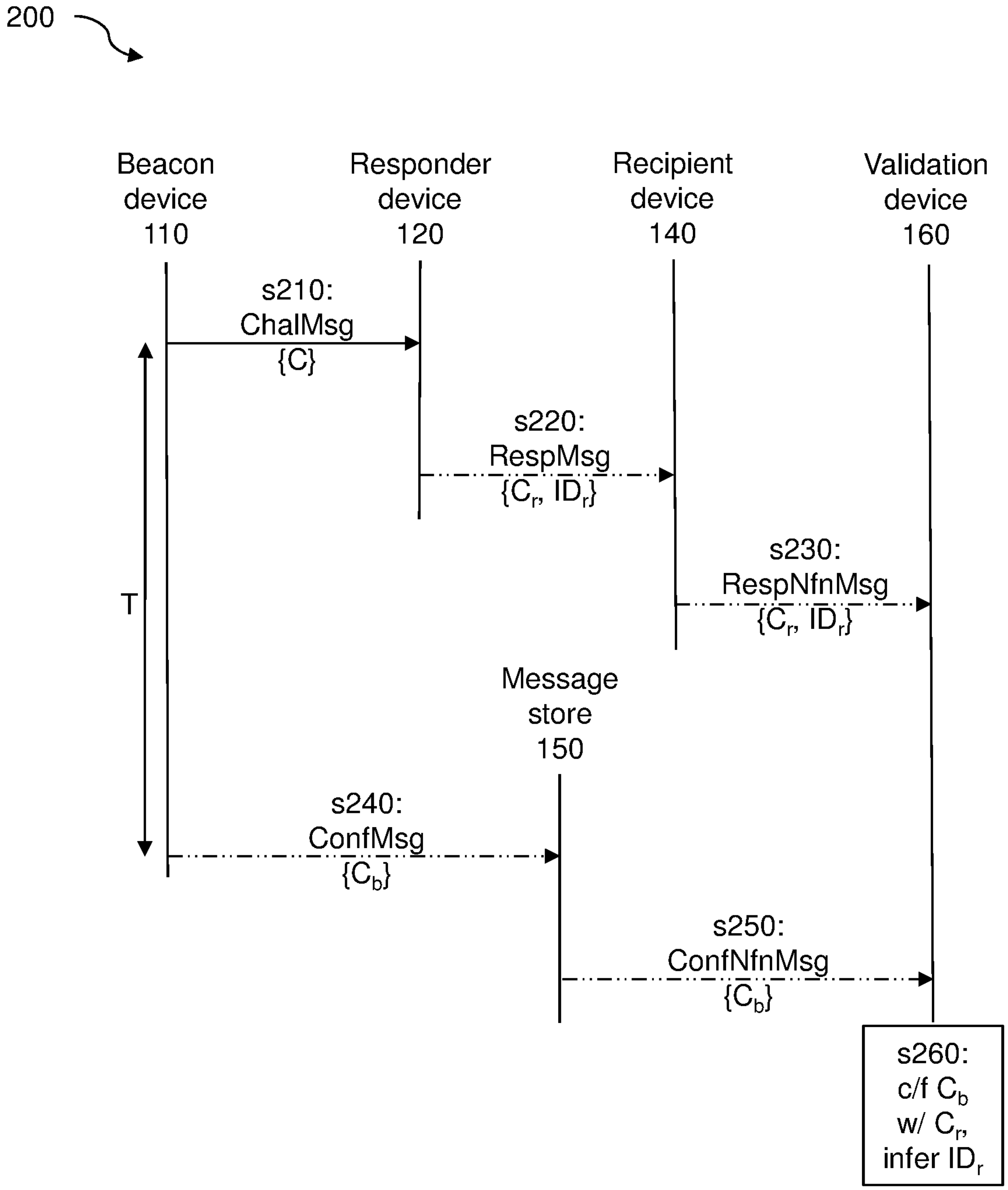
FIG. 2 illustrates an example delayed confirmation validation method.

FIG. 2 illustrates an example delayed confirmation validation method 200 which could be used in the system 100 of FIG. 1.

At s210 the beacon device 110 transmits a challenge message (ChalMsg) comprising challenge message contents C to each of one or more responder devices 120 over a respective direct communication link 130. (Only one responder device 120 is shown in FIG. 2, for clarity.) The challenge message invites the responder device 120 to transmit a response message (RespMsg) to a respective recipient device 140 at s220. The response message comprises an indication $C_r$ of the responder device 120's knowledge of the contents C of the challenge message, together with an identifier $ID_r$ of the responder device 120, which is capable of distinguishing it from other responder devices. (For example the response message could be cryptographically signed by the responder device 120.) The response message can be sent over a direct or indirect communication link.

At s230 a validation device 160 obtains an indication that the response message has been received by the recipient device 140. This could for example be as a result of the recipient device 140 notifying the validation device 160 in response to receiving the response message or as a result of the recipient device 140 responding to a query message (not shown) from the validation device 160, which could for example be issued by the validation device 160 periodically or in response to receipt of a notification from the beacon device 110 that the challenge message has been issued. Either way, the recipient device 140 transmits a response notification message (RespNfnMsg) to the validation device 160. The response notification message comprises the contents $C_r$ of the response message together with the identifier $ID_r$ of the responder device 120 from which the response message originated. The response notification message can be sent over a direct or indirect communication link.

At s240, which is performed a predetermined time period T after transmission of the challenge message at s210, the beacon device 110 transmits a confirmation message (ConfMsg) to a message store 150. The confirmation message comprises an indication $C_b$ of the beacon device 110's knowledge of the contents C of the challenge message. The confirmation message can be sent over a direct or indirect communication link.

At s250 the validation device 160 obtains an indication that the confirmation message has been received by the message store 150. This could for example be as a result of the message store 150 notifying the validation device 160 in response to receiving the confirmation message or as a result of the message store 150 responding to a query message (not shown) from the validation device 160, which could for example be issued by the validation device 160 periodically or in response to receipt of a notification from the beacon device 110 that the confirmation message has been issued. Either way, the message store 150 transmits a confirmation notification message (ConfNfnMsg) to the validation device 160. The confirmation notification message comprises the indication $C_b$ of the beacon device 110's knowledge of the contents C of the challenge message. The confirmation notification message can be sent over a direct or indirect communication link.

At s260 the validation device 160 compares the contents $C_r$ of each response message which preceded the confirmation message in time, if any, to the contents $C_b$ of the confirmation message. For those that match, the validation device 160 infers that the respective responder device 120 received the challenge message over its respective direct communication link 130.

As a preliminary to s260, the validation device 160 can determine which of the response messages, if any, preceded the confirmation message in time. (Alternatively this determination can be made by another device communicably coupled to the validation device 160 and the validation device 160 informed of the result.) For example, this may comprise determining for which response messages $t_r<t_s$, where $t_r$ is the time the response message was transmitted by the responder device 120 having identifier $ID_r$ and $t_s$ is the time the confirmation message was transmitted by the beacon device 110. $t_r$ and $t_s$ could for example be timestamps respectively comprised in the response and confirmation messages and could be respectively included in the response notification and confirmation notification messages. Proxies for $t_r$ and/or $t_s$ could alternatively or additionally be used in determination of which response messages, if any, preceded the confirmation message in time. For example in implementations where it is reasonable to make assumptions about processing and/or transmission delays the time the challenge message was received by the responder device 120 or the time the response message was received by the recipient device 140 could be used as a proxy for $t_r$ and/or the time the confirmation message was received by the message store 150 could be used as a proxy for $t_s$.

In some implementations it may not be possible to trust the responder devices 120 to honestly report the times they transmitted their respective response messages, in which case the respective recipient device 140 and/or the validation device 160 could determine whether any timing claims made by a responder device 120 are likely to be false, based on the time the recipient device 140 received the respective response message and context-specific assumptions about the minimum processing time of the responder device 120 and/or the minimum latency of the responder device 120's communication link with the recipient device 140.

If the recipient device 140 is the message store 150 then the respective timings $t_r$ and $t_s$ of the response message and the confirmation message need not be communicated at all, provided the message store 150 is configured to only store and/or forward to the validation device 160 response messages it receives in advance of the confirmation message.

Figure 3:
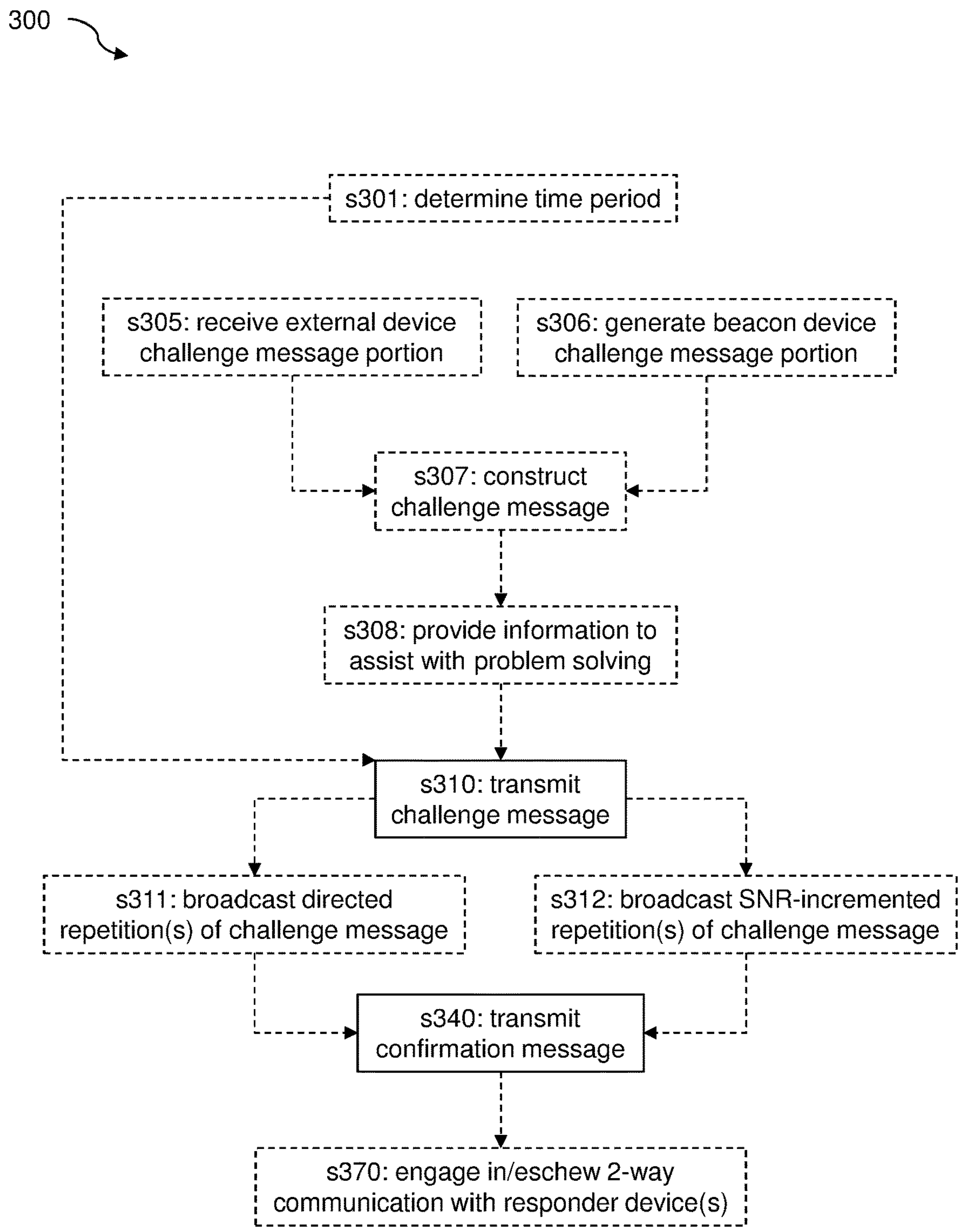
FIG. 3 is a flowchart illustrating an example delayed confirmation validation method which can be performed by a beacon device.
Figure 4:
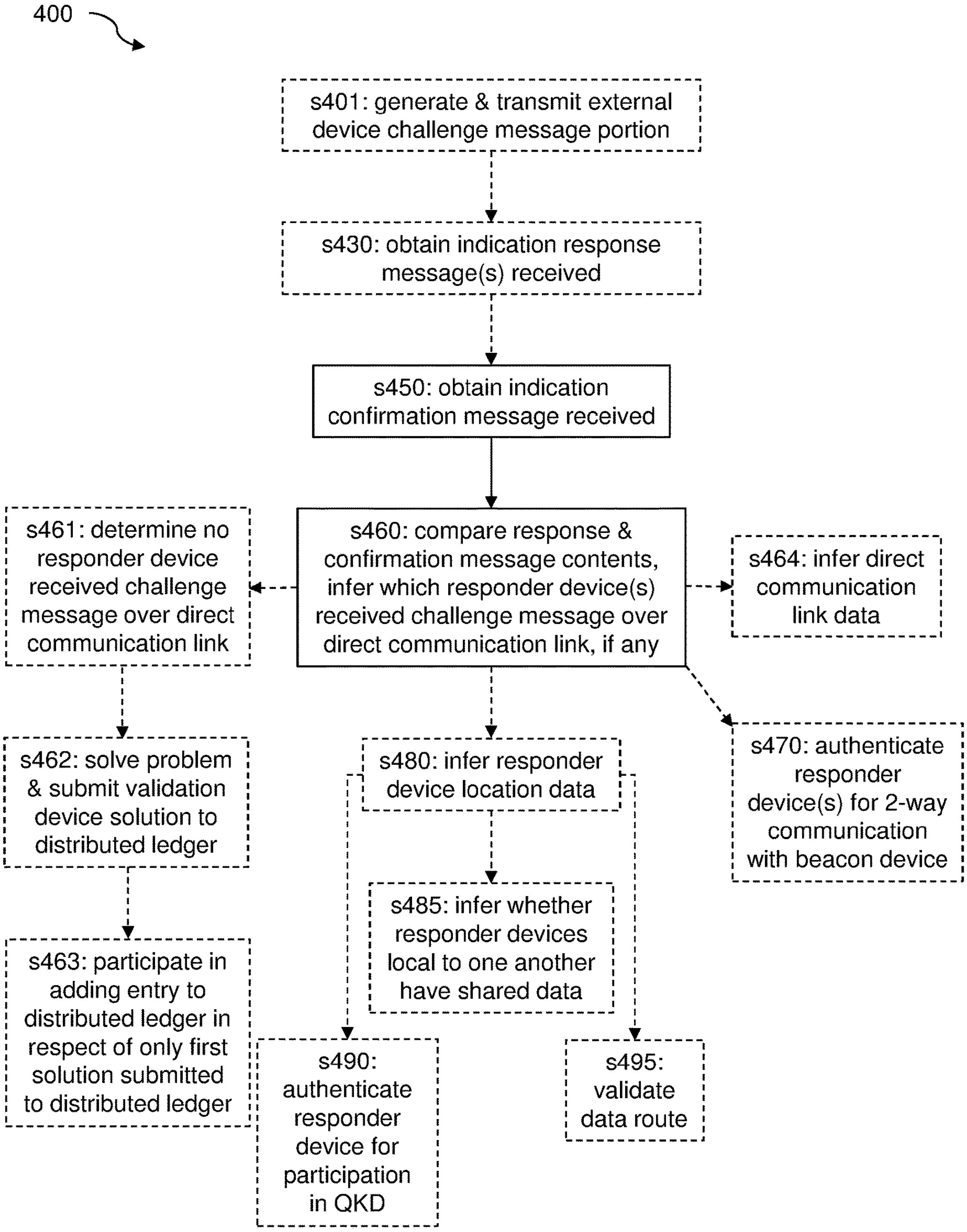
FIG. 4 is a flowchart illustrating an example delayed confirmation validation method which can be performed by a validation device.

FIGS. 3 and 4 are flowcharts illustrating example delayed confirmation validation methods 300, 400 which can respectively be performed by the beacon device 110 and the validation device 160.

At s310 of FIG. 3 the beacon device 110 transmits a challenge message to each of the one or more responder devices 120*a*, 120*b* over the respective direct communication links 130*a*, 130*b*, to invite the responder devices to each transmit to the respective recipient device 140*a*, 140*b*, distinct from the beacon device 110, their respective response message indicating knowledge of contents of the challenge message. At optional s430 of FIG. 4 the validation device 160 obtains an indication that one or more such response messages have been received.

A predetermined time period after transmission of the challenge message, at s340 of FIG. 3, the beacon device 110 transmits a confirmation message to the message store 150, the confirmation message indicating knowledge of the contents of the challenge message such that the validation device 160 can compare contents of each response message which preceded the confirmation message in time, if any, to contents of the confirmation message and infer therefrom which of the respective responder devices 120*a*, 120*b*, if any, received the challenge message over the respective direct communication link 130*a*, 130*b*.

At s450 of FIG. 4, the validation device 160 obtains an indication that the confirmation message from the beacon device 110 has been received by the message store 150, the confirmation message indicating knowledge of the contents of the challenge message and having been transmitted by the beacon device 110 a predetermined time period after its transmission of the challenge message. Responsive thereto, at s460 the validation device 160 compares contents of each response message which preceded the confirmation message in time, if any, to contents of the confirmation message and infers therefrom which of the respective responder devices 120*a*, 120*b*, if any, received the challenge message over the respective direct communication link 130*a*, 130*b*.

Distance Bounding

Data relating to location of each of the one or more responder devices 120*a*, 120*b* inferred to have received the challenge message over the respective direct communication link 130*a*, 130*b*, relative to the beacon device 110, at a time the challenge message was issued can be inferred from timings of their respective response messages. For example, the validation device 160 can perform this stp as shown at optional s480 of FIG. 4. The inferences which can be made depend on what is known or can be reasonably assumed about the system 100, but it may for example be possible to put respective upper bounds on the distance between the beacon device 110 and each responder device 120*a*, 120*b*, since the challenge message cannot be transmitted faster than the speed of light.

The delayed confirmation validation methods 200, 300, 400 described herein may be useful for determining location data in many different types of system. For example, the beacon device 110 could be positioned in a fixed location and each responder device 120*a*, 120*b* could be comprised in or carried by a mobile entity such as a vehicle, robot or individual, or vice-versa. Alternatively both the beacon device 110 and one or more of the responder devices 120*a*, 120*b* could be comprised in or carried by a mobile entity. Vehicles can include land, water, air and space vehicles, whether under human control or autonomous-such as unmanned aerial vehicles (UAVs, or 'drones'), driverless cars and delivery robots. Devices associated with individuals, in the sense that they can be assumed to be co-located with individuals, include personal mobile devices such as smartphones, wearable devices such as smartwatches, and implants.

A plurality of beacon devices 110 could be provided at various locations to enable locating of responder devices 120*a*, 120*b* over larger regions and so that they can be located more precisely via triangulation. For example, existing public WiFi network access points (e.g. provided on lampposts or via public interfaces of private WiFi access points) could be configured to act as beacon devices 110. In some implementations, a plurality of beacon devices 110 within a locality (e.g. a building) can be controlled by a single entity which can send messages to all of the plurality of beacon devices 110 at the same time, or can control a first beacon device 110 to relay messages to one or more other beacon devices 110 of the plurality.

The location detection methods described herein can for example be used as an alternative to existing location detection methods such as those using satellites (e.g. Global Positioning System, GPS, satellites), in particular in situations where satellite line of sight is not available or where satellite communication frequencies suffer from interference or are maliciously jammed. The location detection methods described herein could also be used to confirm reported locations, for example in scenarios where there is a danger of GPS coordinates being maliciously or fraudulently spoofed. In particular, proof of location via the methods described herein could be used to authenticate network devices as being in the location they claim to be in, preventing 'man in the middle' attacks. The location detection methods described herein can also be used to confirm assumed locations, for example to confirm that an asset such as a femtocell base station remains in a location it has been deployed to and has not been relocated.

Examples of uses for location data determined according to the location detection methods described herein include:

- locating goods (e.g. to facilitate delivery tracking or queue prioritization, such as for shipping containers arriving at a port);
- locating individuals (e.g. so that individuals attempting to meet can find one another, or to identify close contacts of virus carriers);
- management of autonomous mobile entities (e.g. warehouse or delivery robots, driverless cars, UAVs, or drones);
- locating vehicles (e.g. for air traffic control, to identify witnesses to a traffic accident, estimate arrival time of a public transport vehicle such a train or a bus at a station or stop, or find local private hire vehicles such as taxis or rental bikes);
- RFID (radio frequency identification)/NFC (near field communication) tag use cases such as electronic card/device payments and secure area entry; and
- authenticating the location of network nodes, as will be described in more detail below under "Quantum key distribution authentication", "Data route validation" and "Communication validation".

It may be possible to determine further data relating to location of each of the one or more responder devices 120*a*, 120*b* in some implementations. For example, if the beacon device 110 comprises a superheterodyne receiver and a responder device 120 transmits a pulse signal to it in response to receiving the challenge message then any motion of the responder device with respect to the beacon device 110 can be detected from the temporal dispersion of the pulse as received by the beacon device 110. This data can for example be added to the message store by the beacon device 110, or the beacon device 110 could send it to the responder device 120 (optionally with a digital signature) to append to its response message.

Further data relating to the location of each of the one or more responder devices 120*a*, 120*b* could be determined if the response messages comprise one or more measurements or observations sensed by the respective responder device 120*a*, 120*b*. Such sensed data can then be compared with corresponding data sensed by the beacon device 110 to confirm the respective responder device 120's locality with respect to the beacon device 110. Alternatively or additionally, sensed data from one responder device 120*a* could be compared with corresponding data sensed by another responder device 120*b* to confirm their locality with respect to one another. In one implementation, data sensed by one responder device could be compared to an average of corresponding data sensed by all beacon 110 and responder 120 devices in the vicinity. Such an average could be weighted, for example with weight allocated according to trust, e.g. with data sensed by the beacon devices 110 being weighted more heavily than data sensed by the responder devices 120. A location claim made by a responder device 120 in its response message could for example be deemed fraudulent if its sensed data component deviates from the average by more than a threshold (e.g. one standard deviation). The sensed data could be timestamped to facilitate meaningful comparison.

Such sensed data could for example comprise: temperature, humidity, radiation (e.g. light and/or microwave) magnitude and/or frequency, acoustic background magnitude and/or frequency, a camera image, biometrics such as electrocardiogram (ECG) readings (e.g. if the responder device 120 is a wearable device), and/or chemical environment measurements e.g. collected by a digital nose. The measurements/observations could either be instantaneous or taken over a finite time period in order to capture any time-dependency in the variable being measured. The sensed data could comprise environmental characteristics beyond the control of the system operator, for example variables such as temperature and/or humidity dependent on prevailing weather conditions.

Alternatively or additionally, a localized phenomenon could be introduced to the environment of the beacon device 110 for the responder devices to sense. This could be something (semi-) permanent, for example a QR code poster or a persistent signal such as an ultrasonic vibration or a background light. Alternatively or additionally it could be something temporary such as a brief audio signal, a flash of light, a projection (e.g. of a QR code), a chemical release (e.g. a spray of scent), or an additional telecommunication signal. Such a temporary localized phenomenon could be timed to substantially coincide with transmission of the challenge message by the beacon device 110. Such a localized phenomenon could be caused for example by the beacon device 110 or, in order to reduce the trust required of the beacon device 110, another apparatus in the vicinity of the beacon device 110.

In some systems where the responder devices 120 are mobile they may cooperate in a stigmergic manner so that all those desiring access to the beacon device 110 can move within range of the challenge message signal. Specifically, the responder devices 120 could publish an indication of their respective locations at the time they receive the challenge message, for example by broadcast transmission or submission to the message store 150, such that mobile devices with access to these location indications can infer a region in which the beacon device 110 is located. This may be useful for example if the beacon device 110 is a roving drone charging point, e.g. located on a military vehicle in a warzone, since the location of all the drones can be tracked and any that end up out of range of the charging point can find their way back.

Quantum Key Distribution Authentication

Another example use of location data determined according to the location detection methods described herein is to authenticate a responder device for participation in quantum key distribution (QKD).

QKD enables two parties to produce a shared random secret key known only to them, which can then be used to encrypt and decrypt messages. However, it relies on the parties being able to authenticate each other's identity. One way in which this can be achieved is to confirm that each party is in fact located where it claims to be located. For example, if a party claims to be located in a data exchange then this can be confirmed if a beacon device 110 is sited in the data exchange and that party responds quickly and correctly to a challenge message issued by the beacon device. Provided the delay between the beacon device issuing the challenge and confirmation messages in short enough, a computational attack on authentication performed in this way would be unviable.

When QKD is to be performed between two parties separated by a distance greater than the range of a single quantum channel, trusted nodes can be established between the parties so that a chain of QKD-secured links is formed over which an end-to-end key can be relayed. Location data determined according to the location detection methods described herein could be used to authenticate one or more trusted nodes intermediate two QKD endpoints, and/or the endpoints themselves. If the challenge and response messages comprise an identifier for the overall QKD process (e.g. a hash of the end-to-end key ID) then it will be possible to trace the journey taken by the end-to-end key.

Optional s490 of FIG. 4 indicates how, if one of the responder devices is co-located with a QKD link terminal or QKD trusted node then the validation device 160 could authenticate that responder device for participation in QKD based on the inferred data relating to the location of that responder device relative to the beacon device.

Data Route Validation

Another example use of location data determined according to the location detection methods described herein is to validate the path taken by data communicated over an indirect communication link. This may be desirable for example to confirm that the data has only been routed through trusted data centers and is therefore unlikely to have been observed or tampered with by malicious parties.

Optional s495 of FIG. 4 indicates how, when each response message comprises data intended for a respective recipient device 140*a*, 140*b* and originating from a respective sender device 170*a*, 170*b* (shown in FIG. 1) distinct from the respective responder device 120*a*, 120*b*, the validation device 160 can validate the data originating from the respective sender device 170*a*, 170*b* as having been routed via a respective responder device 120*a*, 120*b* local to the beacon device 110.

For example, the responder device 120*a* could be a router located in a trusted data exchange. Data D could be communicated from a sender device 170*a* to a recipient device 140*a* via the router 120*a*. The beacon device 110 could be sited in the trusted data exchange and the router 120*a* can append data $C_{r'}$ indicating knowledge of contents of the challenge message to the data D it receives from the sender device 170*a* before forwarding it on to the recipient device 140*a*. For example, $C_{r'}$ could be inserted into a header of a frame carrying D. (The beacon device 110 could for example issue challenge messages periodically, with the router 120*a* storing the most recent $C_{r'}$ for use when it receives D.) In this way, the validation device 160 can confirm that the router 120*a* was located close to the beacon device 110 at the time the data D was routed through it.

As explained above, a single computing device, such as a server, could perform the roles of both the recipient device 140*a* and the validation device 160. A particularly efficient system configuration for implementation of data route validation would be for each recipient device 140*a*, 140*b* to serve as a validation device 160 in respect of response messages which it receives, rather than a single validation device 160 being provided centrally. If the message store 150 is provided as a distributed ledger and the recipient devices 140*a*, 140*b* are nodes of the distributed ledger network then the recipient device 140*a* could validate D as having been routed via a responder device 120*a* local to the beacon device 110 using its local copy of the distributed ledger, without recourse to any remote validation device or message store.

Figure 5:
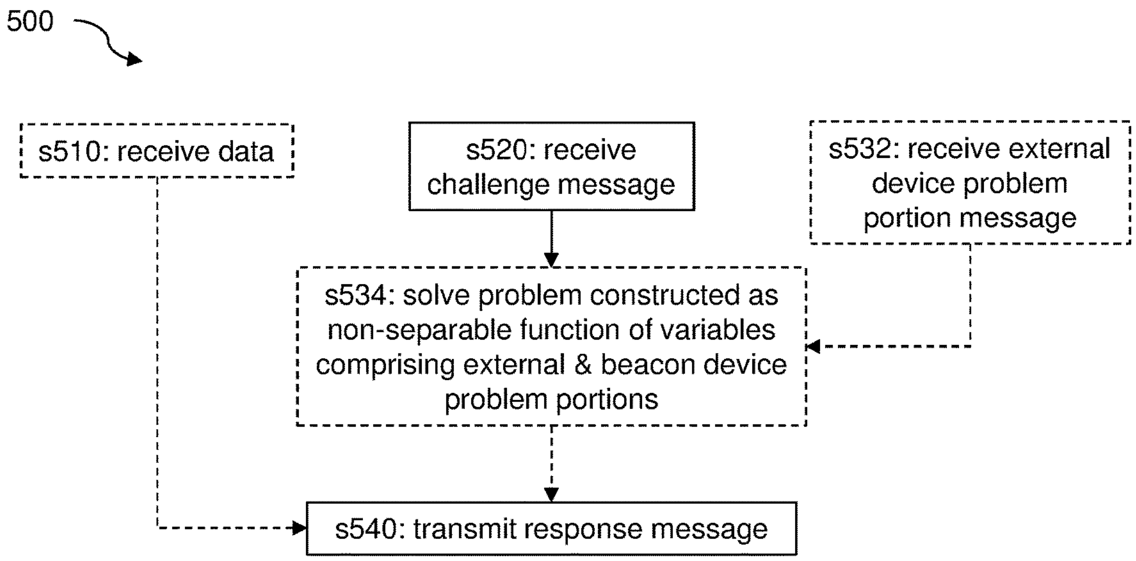
FIG. 5 is a flowchart of a method which can be performed by a responder device.

FIG. 5 is a flowchart of a method 500 performed by a responder device 120*a*, which may for example be a network node via which data is routed, for example as described above. In implementations where the method 500 is a data route validation method, at optional s510 the responder device 120*a* receives data originating from a sender device 170*a* intended for a recipient device 140*a*. At s520 the responder device 120*a* receives a challenge message from a beacon device 110 over a direct communication link 130*a*. Operations at s510 and s520 can occur in series in either order, or partially or fully in parallel. Once both s510 and s520 are completed, at s540 the responder device 120*a* transmits a response message to the recipient device 140*a*, the response message comprising the data received from the sender device 170*a* and indicating knowledge of contents of the challenge message such that the data originating from the sender device 170*a* can be validated as having been routed via a responder device 120*a* local to the beacon device 110 by comparing contents of the response message to contents of a confirmation message indicating knowledge of the contents of the challenge message, the confirmation message having been transmitted by the beacon device 110 to a message store 150 a predetermined time period after transmission of the challenge message.

Just in Time Challenge Generation

Whether the challenge message is issued by the beacon device as part of a delayed confirmation validation process 200, 300, 400, 500 as described above and/or for another purpose, such as communication validation as described below, some trust must be put in the beacon device 110 not to release the challenge message contents to any party prematurely. (An untrustworthy beacon device 110 could for example favor one or more of the responder devices 120 over others by giving it/them a 'head-start'. Alternatively or additionally an untrustworthy beacon device 110 could communicate the challenge message to one or more devices which do not have a direct communication link 130 with it at all, so that they can fraudulently claim they do.)

The trust required of the beacon device 110 can be reduced by making issue of the challenge message dependent on receipt of a trigger message from another device, external to the beacon device 110, such as the validation device 160 or a separate external device 180 as shown in FIG. 1. Such a trigger message can for example comprise a portion of the challenge message such that the challenge message cannot be issued until it has been received. In some implementations, the beacon device 110 may receive two or more external device challenge message portions from a respective two or more external devices 180, in order to spread trust more thinly around components of the system.

FIG. 4 shows at optional s401 how the validation device 160 can generate an external device challenge message portion, for example a random string, and transmit it to the beacon device 110. FIG. 3 shows at optional s305 how the beacon device 110 can receive, from another device, external to the beacon device 110, such as the validation device 160 or other external device 180, an external device challenge message portion. At optional s306, the beacon device 110 can generate a beacon device challenge message portion, for example another random string. At optional s307, the beacon device 110 can construct the challenge message from the external device challenge message portion and the beacon device challenge message portion. The s310 of transmitting the challenge message can be responsive to the optional s307 of constructing the challenge message.

Constructing the challenge message from the external device challenge message portion and the beacon device challenge message portion could for example involve concatenation of the two message portions. However, in this case the beacon device 110 could still provide an unfair advantage to one or more responder devices 120 by pre-issuing the beacon device challenge message portion to them. It therefore can be advantageous in some embodiments for the challenge message to combine the external device challenge message portion and the beacon device challenge message portion in such a way that both must be known before determination of a suitable response can be started, so that knowledge of the beacon device challenge message portion, without knowledge of the full challenge message contents, does not assist in response to the challenge message. To achieve this, the beacon device 110 can construct the challenge message contents as a non-separable function of two or more variables, where the beacon device challenge message portion provides at least one of said variables and at least one other of said variables is received by the beacon device (as opposed to being generated by it) in an external device challenge message portion.

As will be described in more detail below, the challenge message contents could pose a problem for the responder devices to solve; i.e. so that the challenge message contents C is a problem and the response message contents $C_r$ is the respective responder device 120's solution to that problem. For example, a problem which meets the criterion of being a non-separable function of two or more variables, at least one of them generated externally from the beacon device 110, as described above could be to find a string completion salt that will cause a concatenation of the external device challenge message portion (which could for example be a random string generated by the validation device 160 or other external device 180) and the beacon device challenge message portion (which could for example be a random string generated by the beacon device 110) to be equal to a predetermined target string (e.g. 00000), under the action of a predetermined hash function. A suitable challenge which meets the criterion outlined above need not require any calculation, however; for example the challenge message contents could comprise a string generated by interleaving characters of strings generated by the beacon device 110 and an external device such as the validation device 160 or another external device 180 and the challenge could be to simply forward this combined string.

Communication Validation

Instead of or in addition to delayed confirmation validation, response to a challenge message issued by a beacon device 110 can be used as a means of validating a responder device 120 for two-way communication with the beacon device 110.

Figure 6:
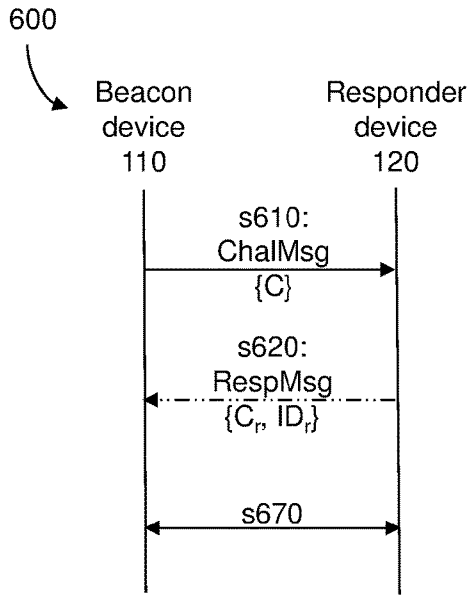
FIG. 6 illustrates an example communication validation method.

FIG. 6 illustrates an example communication validation method 600 wherein the beacon device 110 transmits a challenge message (ChalMsg) to a responder device 120 over a direct communication link 130 at s610, the challenge message comprising challenge message contents C. At s620 the responder device 120 responds to the challenge message with a response message (RespMsg) comprising data $C_r$ indicating knowledge of the challenge message contents C, together with an identifier ID, capable of distinguishing it from other responder devices. (The identifier ID, could for example comprise a digital signature to authenticate the responder device 120's identity.) The response message could be sent over the direct communication link 130 or some other direct or indirect communication link. Provided the timing of the response message satisfies some appropriate criterion, for example that it is received before expiry of a timer started by the beacon device 110 when it issues the challenge message, at s670 the beacon device 110 engages in two-way communication with the responder device 120 over the direct communication link 130, for example by establishing a communication session.

Figure 7:
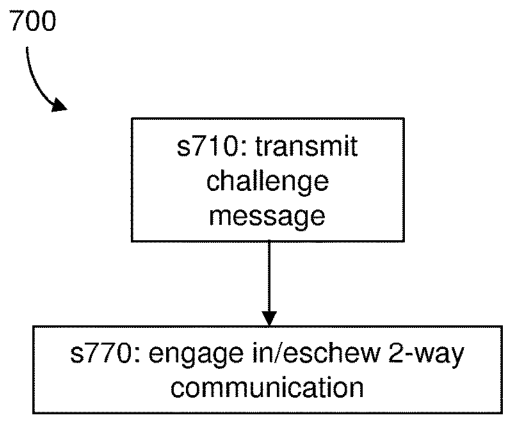
FIG. 7 is a flowchart of a communication validation method which can be performed by a beacon device.

A communication validation method 700 performed by a beacon device 110 is illustrated in FIG. 7. At s710, the beacon device 110 transmits a challenge message to each of one or more responder devices 120*a*, 120*b* over a respective direct communication link 130*a*, 130*b*, to invite the responder devices 120*a*, 120*b* to each transmit a respective response message indicating knowledge of contents of the challenge message. At s770 the beacon device 110 either engages in or eschews subsequent two-way communication with each of the one or more responder devices 120*a*, 120*b* over the respective direct communication link 130*a*, 130*b*, in dependence on if and when a response message is received from it. Engaging in two-way communication can for example comprise establishing and conducting a communication session. Eschewing two-way communication can for example comprise failing to respond to a request for a communication session, or responding to such a request in the negative. The response message could be considered to be such a request.

The communication validation method 700 could be arranged to provide competitive access to two-way communication with the beacon device 110, wherein only the first responder device 120*a*, 120*b* to respond to the challenge message is accepted. That is, the beacon device 110 is configured to engage in subsequent two-way communication with a responder device 120 whose response message was earliest (e.g. received first or carrying an earliest timestamp) and eschew subsequent two-way communication with other responder devices. In this way, only the lowest latency direct communication link 130 is used. The subsequent two-way communication between the winning responder device 120 and the beacon device 110 can proceed more efficiently since the beacon device 110's resources are not required for communication with other responder devices.

Alternatively, the beacon device 110 could be configured to engage in subsequent two-way communication with any responder device 120 whose response message beat (e.g. is received by or is timestamped prior to) a cut-off time (and eschew subsequent two-way communication with other responder devices). This effectively imposes a limit on the latency and thus the likely quality of service available on two-way communication with the beacon device 110. Since the beacon device 110 does not engage in two-way communication on low quality links its resources are not taken up by repeated communication of the same messages to combat high error rates.

The beacon device 110 could for example be a network node such that either engaging in or eschewing subsequent two-way communication with each of the one or more responder devices comprises respectively providing or denying network access to each of the one or more responder devices.

While FIG. 6 illustrates a standalone communication validation method 600, such communication validation could be the result of a delayed confirmation validation method 200, 300, 400 as described above. This is shown at optional s470 of FIG. 4, wherein the validation device 160 authenticates one or more of the responder devices 120 for two-way communication with the beacon device 110 in dependence on the result of s460. At optional s370 of FIG. 3 the beacon device 110 either engages in or eschews subsequent two-way communication with each of the responder devices 120 accordingly. As for the standalone communication validation, validation could be limited to the first responder device 120 to respond or to only those responder devices 120 that respond prior to a cut-off time. Engaging in or eschewing subsequent two-way communication could also comprise respectively providing or denying network access if the beacon device 110 is a network node.

In some systems where the responder devices 120 are mobile they may cooperate in a stigmergic manner so that all those desiring access to the beacon device 110 can move within range of the challenge message signal. Specifically, the responder devices 120 could publish an indication of their respective locations at the time they receive the challenge message, for example by broadcast transmission or submission to a message store, such that mobile devices with access to these location indications can infer a region in which the beacon device 110 is located. This may be useful for example if the beacon device 110 is a mobile network access point, e.g. located on a military vehicle in a warzone, and the responder devices 120 are drones which perform reconnaissance over large areas but require a direct communication link with the network access point 110 to report their findings for security reasons.

Problem-Based Challenge

In the methods described above it is not specified in what way the response messages indicate knowledge of the contents of the challenge message. In some implementations, the data $C_r$ in the response message indicating knowledge of the contents C of the challenge message could be that contents C itself. Alternatively, the challenge message could indicate a problem C for the responder devices 120*a*, 120*b* to solve. Each response message could indicate a respective responder device solution $C_r$ to the problem C.

In delayed confirmation validation methods 200, 300, 400, 500 the confirmation message contents $C_b$ could either be the problem C or a beacon device solution to the problem C. Inferring which of the respective responder devices 120*a*, 120*b*, if any, received the challenge message over the respective direct communication link 130*a*, 130*b* in delayed confirmation validation methods 200, 400 can comprise determining whether each responder device solution is a correct solution to the problem.

In communication validation methods 600, 700 engaging in or eschewing subsequent two-way communication with each of the responder devices 120 can be in dependence on whether each responder device solution is a correct solution to the problem posed in the challenge message.

Since it is generally possible to predict how long it will take a computing device of a given specification to solve a computational problem, in delayed confirmation validation methods 200, 300, 400, 500 where the challenge message comprises a problem the problem can be tailored to an acceptable delay between the challenge and confirmation messages, or vice-versa, based on assumptions about the capabilities of the responder devices 120 expected to respond, or based on the capabilities of responder devices 120 from which responses are desired. That is, the beacon device 110 can determine the time period between transmission of the challenge and confirmation messages based on a predicted solving duration for a target solving device as shown at optional s301 of FIG. 3. Alternatively, the beacon device 110 can construct the challenge message at optional s307 so that the problem has a predicted solving duration for a target solving device based on the predetermined time period. (If the challenge message comprises an external device challenge message portion and a beacon device challenge message portion then either or both challenge message portions can be constructed so that the problem has the desired target device predicted solving duration.) The predicted solving duration could for example be varied for a problem involving decryption by varying the length of the key.

In implementations where the challenge message comprises a problem, responses can be restricted to responder devices 120 having good quality/short direct communication links 130 with the beacon device 110 by constructing the problem such that at least a threshold signal-to-noise ratio (SNR) is required to solve it. For example, data in the challenge message indicating the problem can comprise one or more codes constructed such that a predetermined threshold SNR is required at a responder device 120 for it to successfully decode them. Examples of suitable codes include low density parity codes (LDPCs), turbo codes, polar codes, and tornado codes.

Another way in which responses can be restricted to responder devices 120 having good quality/short direct communication links 130 with the beacon device 110 is by constructing the problem such that solving probability and/or solving duration are strongly dependent on the error rate in the received challenge message. For example, data in the challenge message indicating the problem can comprise one or more codes constructed such that they are computationally harder to decode the greater the error rate in the challenge message when received. Examples of suitable codes include LDPCs and tornado codes.

Where data in the challenge message indicating the problem comprises one or more codes those codes can encode the problem. Alternatively, the problem can be to decode the codes.

Another type of problem which could be used in challenge messages is determination of a salt (an input value) that, when combined with a specified input string via a cryptographic hash function, produces an output string comprising a specified string, such as a specified number of occurrences of a specified character, optionally at a specified position in the output string. An example of this type of problem is "combine this random sequence:

fb1d2ed8-a724-400f-90fb-53273636db33 with a salt (solver's choice) to generate a SHA512 hash starting with 0".

The solver would then follow a process such as:

$$\text{hash}\left(fb1d2ed8-a724-400f-90fb-53273636db33+0\right)=$$
$$db542442e2ff795af703ee2e0477315d2f4b8044d82d24b761696737 \quad \text{(INVALID)}$$

$$\text{hash}\left(fb1d2ed8-a724-400f-90fb-53273636db33+1\right)=$$
$$d42e320f946b91021f832b3e34f2a3352563045c2b799e25aaa844af \quad \text{(INVALID)}$$

$$\text{hash}\left(fb1d2ed8-a724-400f-90fb-53273636db33+2\right)=$$
$$2973b10d4d7daa44ebcbebc52a501c5b5a4a0751ef9558366c255be6 \quad \text{(INVALID)}$$

$$\text{hash}\left(fb1d2ed8-a724-400f-90fb-53273636db33+3\right)=$$
$$011e3b354f018bedb34b453786dfd0f742ce0d79c59be42cdadb539c \quad \text{(VALID)}$$

SHA512 is just one example of an algorithm which could be used. The specified algorithm and/or the required string in the output could be tailored based on expected/desired responder device 120 capabilities and/or target solving duration to adjust the difficulty of the problem as explained above. (The longer the required string the greater the expected solving duration for a device with given computing capabilities.)

The specified part of the input could for example comprise a beacon device challenge message portion and an external device challenge message portion as described above in relation to just in time challenge generation.

Any hash algorithm used in some embodiments can be robust to collision to ensure a consistent probability of a random guess being correct. (The hash can have only one viable answer in one embodiment.) This reduces the risk of responder devices 120 being able to provide a hash so quickly that they have time to relay it to other devices which do not have any direct communication link 130 with the beacon device 110 (or which have a higher latency and/or lower quality direct communication link 130 with the beacon device 110).

The challenge could optionally be made specific to each responder device 120, for example by being dependent on a responder device identifier. If a salt determination problem as described above is used for example then the specified input could comprise a random string specified in the challenge message, generic to all responder devices, concatenated with a responder device identifier. This prevents solutions from being relayed to other devices as each correct solution is unique to a responder device 120. The responder device 120 could optionally cryptographically sign the response message as noted above.

To increase the difficulty of the problem, it could be constructed in a 'nested' manner; that is, so that an 'outer problem' must be solved to obtain the problem whose solution is required. Examples of suitable outer problems are to break an encryption of the problem e.g. an asymmetric encryption, or to solve a steganography or learning with errors (LWE) problem.

In some implementations responder devices 120 may be moving with respect to the beacon device 110, but responses may only be desired from those responder devices that remain consistently close to the beacon device 110. For example, the beacon device 110 could be an on-train wireless network access point intended to provide network access only to mobile devices of passengers on that train, not to devices of passengers in stations through which the train passes. In such scenarios the problem could be a 'jigsaw problem'. That is, the challenge message could be transmitted as a plurality of temporally-separated challenge message fractions, such as pieces of an algebraic equation, constructed such that all of the challenge message fractions must be received in order to obtain the problem.

In some circumstances it may be desirable to limit the opportunity to respond to challenge messages to a certain set of responder devices 120 (e.g. a set of registered/trusted responder devices), or to 'level the playing field' between responder devices having different computing capabilities, by implementing a handicap scheme. To enable this, the beacon device 110 may, prior to or at the same time as transmitting the challenge message, provide some (but not all) of the responder devices 120 with an information advantage to assist with solving the problem as shown at optional s308 of FIG. 3. For example, if the problem involves decryption then a decryption key could be provided to some of the responder devices 120. Nested problems as described above are particularly suitable for handicap schemes. Multiple nesting layers could be used if more handicap categories are required. Alternatively or additionally, the challenge message could be issued repeatedly, encoded in a manner configured to be accessible to a different responder device 120 each time. In this way the order in which the responder devices decode the challenge message can be controlled, for example so that responder devices with lower computing capabilities have a head-start on solving the problem. For example, each repetition of the challenge message could be encrypted with a different key, each key corresponding to one held by a different responder device 120. Alternatively or additionally, a code-division multiple access (CDMA) scheme could be used, with each repetition of the challenge message modulated with a different code, each code corresponding to one known by a different responder device 120. In quantum implementations, each repetition of the challenge message could be transmitted using a different basis sequence, each basis sequence corresponding to one known by a different responder device 120.

In some implementations, it may be mandated for all responder devices 120 to have comparable capabilities in respect of receipt of the challenge message, determination of the respective responder device solution and transmission of the respective response message, so that the handicapping scheme described above is not necessary. In other implementations variation in responder device capabilities may be permitted so long as those capabilities are known so that they can be taken into account (and a handicapping scheme optionally implemented).

In either case the responder devices 120 could be tested, e.g. periodically or on a random ad hoc basis, to confirm that upgrades have not been made without due notification. For example the local response to electromagnetic pulses injected into a responder device's transceiver could be measured to confirm that the transceiver's circuitry and/or antenna have not been modified. Such testing could also pick up any hardware performance degradation which may have occurred so that the responder device 120 can be serviced as required.

A problem posed in the challenge message could comprise a requirement to sense data in the manner described above under "Distance bounding". In implementations where the sensed data relates to a localized phenomenon introduced into the environment that localized phenomenon could for example be a message communicated by a device 180 external to the beacon device 110 in order to reduce the trust required of the beacon device in a similar manner to that described above in relation to just in time challenge generation. That is, the problem could comprise both a beacon device problem portion (in the challenge message) and an external device problem portion (in the message communicated by the external device 180). The problem could be formed by combining the beacon and external device problem portions in the same ways described above for combination of beacon and external device challenge message portions. Optional s532 and s534 of FIG. 5 illustrate this. At optional s532, the responder device 120 receives, from a device 180 external to the beacon device 110, over a direct communication link 190 as shown in FIG. 1, an external device problem portion message comprising an external device problem portion. Operations at s532 and s520 (receipt of the challenge message) can occur in series in either order, or partially or fully in parallel. Once both s520 and s532 are complete, at optional s534, the responder device 120 solves a problem constructed as a non-separable function of two or more variables, the two or more variables comprising the external device problem portion and a beacon device problem portion comprised in the challenge message. The response message transmitted at s540 then comprises a solution to the problem, such that the data originating from the sender device 170 can be validated as having been routed via a responder device 120 local to both the beacon device 110 and the external device 180 by comparing contents of the response message to contents of the confirmation message transmitted by the beacon device 110 and a further confirmation message transmitted by the external device 180 indicating knowledge of the external device problem portion, the further confirmation message having been transmitted by the external device 180 to a message store (which may be the message store 150, or another message store) a predetermined time period after transmission of the external device problem portion message.

Distributed Ledger Record

As has been mentioned above, the message store 150 of the delayed confirmation validation methods 200, 300, 400, 500 can be a distributed ledger, such as a blockchain. This increases the transparency of the delayed confirmation validation methods 200, 300, 400, 500.

In one implementation, the challenge message indicates a challenge message identifier and the response messages and confirmation message each indicate that challenge message identifier such that each of the response messages is linked to the confirmation message on the distributed ledger by said challenge message identifier. The challenge message identifier could for example be a cryptographic hash (e.g. a hash of the problem if the challenge message comprises one) so that it is substantially unique. (The use of a challenge message identifier to link entries (blocks) on the distributed ledger may not be required if only a single challenge message is ever issued, or if the gap between challenge messages being issued is sufficiently long that any response messages received could only feasibly have been responses to the most recently issued challenge message.)

In the delayed confirmation validation methods 200, 300, 400, 500 it may sometimes be the case that no responder devices 120 respond to the challenge message. In order to ensure the distributed ledger still stores a record of the challenge (and to prevent the chain from stalling in blockchain implementations), the validation device 160 could submit its own message to the distributed ledger, for example in response to being notified of the confirmation message. For example, if the validation device 160 is one of a plurality of peers which can participate in building the distributed ledger and the confirmation message indicates the problem then the validation device, on determining that none of the responder devices received the challenge message over the respective direct communication link as shown at optional s461 of FIG. 4, can solve the problem and submit a resulting validation device solution to the distributed ledger as shown at optional s462. The validation device 160 could compete with the other distributed ledger nodes in this regard. In implementations where the validation device 160 (or the distributed ledger nodes in general) have greater computing capabilities than the responder devices 120 (e.g. where the responder devices are mobile devices and the distributed ledger nodes are server computers) and the challenge message poses a problem for the responder devices to solve the confirmation message could pose that problem nested within an outer problem as described above under "Problem-based challenge" so that the challenge faced by the distributed ledger nodes is sufficiently matched to their capabilities to make competition worthwhile for more nodes than just the node with the lowest latency connection to the distributed ledger network.

Addition of entries to the distributed ledger (e.g. appending blocks to a blockchain) may be arranged to be competitive. For example, if the challenge message comprises a problem then an entry may be added to the distributed ledger in respect of only a first solution to the problem submitted to the distributed ledger. The validation device 160's part in this, in implementations where it is a node of the distributed ledger network, is shown at optional s463 of FIG. 4. There may be an incentive scheme to encourage devices to compete to add entries to the distributed ledger, for example a cryptocurrency reward for devices that succeed in adding entries.

Radio Transmission

In systems 100 where the beacon device 110 issues the challenge message via a radio transmission, location detection methods can be used to glean more information than distance bounding alone.

For example, if the beacon device 110 comprises directional transmission means (e.g. an antenna array) then it can be configured to transmit the challenge message in a first predetermined direction then, as shown at optional s311 of FIG. 3, before submitting the confirmation message to the message store, transmit one or more directed repetitions of the challenge message in one or more respective further predetermined directions. The validation device 160 can then infer which of the predetermined directions is closest to the direction a given responder device 120 is in from the timing of its response message with respect to times the challenge message and the directed repetitions of the challenge message were transmitted.

Data inferred relating to the location of each of the responder devices 120 from timings of each response message with respect to times the challenge message and the directed repetitions of the challenge message were transmitted can be used to determine whether the beacon device should engage in or eschew subsequent two-way communication with each of the one or more responder devices over their respective direct radio communication links, as described in the 'Communication validation' section above. For example, responder devices located in particular regions can be (dis) favored according to operator policies. As one example, responder devices located in a port might be disfavored since they are likely to move out of range, making expenditure of finite resources on establishing two-way communication with them less worthwhile than responder devices located somewhere they are likely to remain for extended periods. As another example, there may be security reasons for limiting access to two-way communication with a beacon device to only responder devices within a certain area, for example where the beacon device is part of a defense mesh radio network.

In some implementations there may be a concern that responder devices 120 can cheat by one or more devices closer to the beacon device 110 relaying the challenge message to them when they are themselves out of range to receive it over a direct communication link 130. Such cheating can be uncovered by the beacon device 110 transmitting the challenge message and directed repetitions according to a predetermined temporal and directional pattern which is varied between challenges. This enables detection of suspiciously prolific response activity associated with a particular direction. For example, the validation device 160 can infer whether responder devices 120 local to one another have shared data as shown at optional s485 of FIG. 4.

Alternatively or additionally to the beacon device 110 comprising directional transmission means, similar information could be gleaned by arranging multiple beacon devices in disparate locations within a region of interest. The challenge message could be transmitted from one of the beacon devices then one or more repetitions of the challenge message could each be issued by a different beacon device according to a predetermined pattern. Timings of response messages with respect to the pattern of transmissions could be used to narrow down the location of responder devices 120.

Signal-to-Noise Ratio Variation

The intensity of the received challenge message signal, and thus its SNR, decreases as the length of the direct communication link 130 increases. A lower signal-to-noise ratio at a responder device 120 reduces its chances of gaining correct knowledge of the challenge message's contents C. This results in an effective upper bound on the length of a direct communication link 130 for the respective responder device 120 to be able to correctly decode the challenge message's contents C from the signal it receives. This upper bound on the length of the direct communication link 130 can be increased by increasing the transmit power used by the beacon device 110 to issue the challenge message. The upper bound on the length of the direct communication link 130 can be decreased by the beacon device 110 adding noise to the signal carrying the challenge message. In this way, the size of a geofenced region within which correct response to the challenge message is effectively possible can be configured.

Information relating to the direct communication links 130, such as the physical length of the links and/or the link quality, can be inferred by varying the SNR of messages transmitted by the beacon device 110. The SNR can be varied by varying the transmit power and/or noise added to the signal. For example, the challenge message can be transmitted at a first predetermined SNR and the beacon device can, between transmitting the challenge message and the confirmation message, transmit one or more SNR-incremented repetitions of the challenge message at successively higher SNRs as shown at optional s312 of FIG. 3. Data relating to the respective direct communication links can then be inferred, for example by the validation device 160 as shown at optional s464 of FIG. 4, from timings of each response message with respect to times the challenge message and the SNR-incremented repetitions of the challenge message were transmitted.

Suitable Data Processing System

Figure 8:
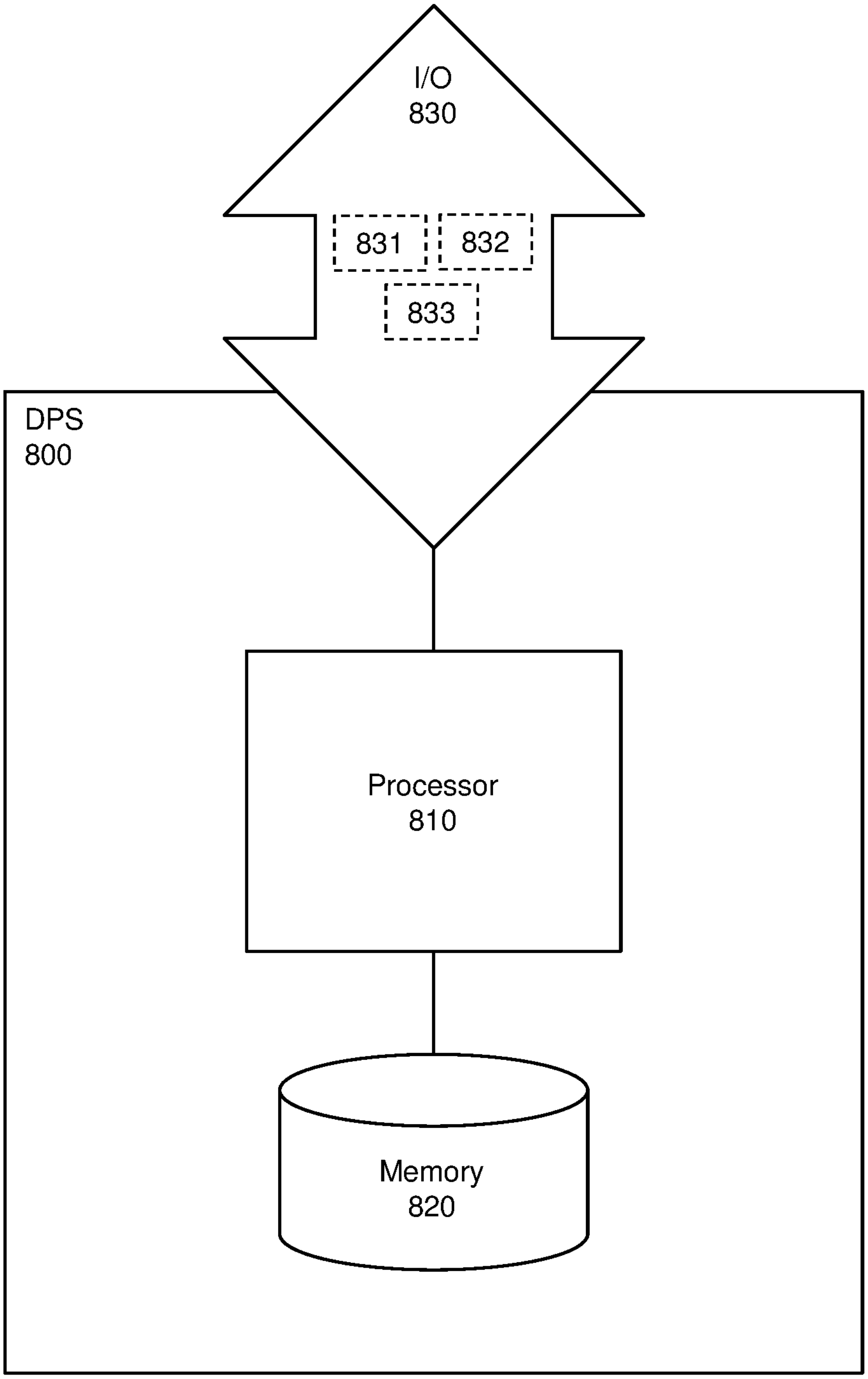
FIG. 8 schematically illustrates an example data processing system.

FIG. 8 schematically illustrates an example data processing system (DPS) 800 capable of performing any of the methods 200, 300, 400, 500, 600 or 700. It comprises a processor 810 operably coupled to both a memory 820 and an interface (I/O) 830.

The memory 820 can optionally comprise computer program instructions which, when the program is executed by the processor 810, cause the data processing system 800 to carry out any of the methods 200, 300, 400, 500, 600 or 700. Alternatively or additionally, the interface 830 can optionally comprise one or both of a physical interface 831 configured to receive a data carrier having such instructions stored thereon and a receiver 832 configured to receive a data carrier signal carrying such instructions.

The receiver 832, when present, can be configured to receive messages. It can comprise one or more wireless receiver modules and/or one or more wired receiver modules. The interface 830 can optionally comprise a transmitter configured to transmit messages. The transmitter 833, when present, can comprise one or more wireless transmitter modules and/or one or more wired transmitter modules.

Interpretation Notes

Embodiments of the disclosure will be apparent to those skilled in the art from consideration of the specification. It is intended that the specification be considered as exemplary only.

Where this application lists one or more method steps, the presence of precursor, follow-on and intervening method steps is not excluded unless such exclusion is explicitly indicated. Similarly, where this application lists one or more components of a device or system, the presence of additional components, whether separate or intervening, is not excluded unless such exclusion is explicitly indicated.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The scope of the present disclosure includes any novel features or combination of features disclosed herein. The applicant hereby gives notice that new claims may be formulated to such features or combination of features during prosecution of this application or of any further applications derived therefrom. In particular, with reference to the appended claims, features from dependent claims may be combined with those of the independent claims and features from respective independent claims may be combined in any appropriate manner and not merely in the specific combinations enumerated in the claims.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus, or system to implement the foregoing described methods is envisaged as an aspect of the present disclosure. Such a computer program may be embodied as source code or undergo compilation for implementation on a processing device, apparatus or system or may be embodied as object code, for example.

Such a computer program may be encoded as executable instructions embodied in a carrier medium, non-transitory computer-readable storage device and/or a memory device in machine or device readable form, for example in volatile memory, non-volatile memory, solid-state memory, magnetic memory such as disk or tape, optically or magneto-optically readable memory such as magnetic tape, compact disk (CD), digital versatile disk (DVD) or other media that are capable of storing code and/or data. Such a computer program may alternatively or additionally be supplied from a remote source embodied in a communications medium such as an electronic signal, radio frequency carrier wave or optical carrier wave. Such carrier media are also envisaged as aspects of the present disclosure.

Such instructions, when executed by a processor (or one or more computers, processors, and/or other devices) may cause the processor (the one or more computers, processors, and/or other devices) to perform at least a portion of the methods described herein.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, smartphones, tablets, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops, and smartwatches.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers unless otherwise expressly stated.

The invention claimed is:

1. A computer-implemented method performed by a validation device, the computer-implemented method comprising:

following transmission of a challenge message by a beacon device to each of one or more responder devices over a respective direct communication link, the challenge message inviting each of the one or more responder devices to prove an existence of a respective direct communication link by transmitting to a respective recipient device, distinct from the beacon device, a respective response message indicating knowledge of contents of the challenge message;

the validation device obtaining an indication that a confirmation message from the beacon device has been received by a message store, the confirmation message indicating knowledge of the contents of the challenge message and having been transmitted by the beacon device a predetermined time period after transmission of the challenge message; and the validation device, responsive to obtaining the indication, comparing contents of each response message which preceded the confirmation message in time, if any, to contents of the confirmation message and inferring therefrom which of the respective responder devices, if any, received the challenge message over the respective direct communication link;

wherein the beacon device comprises directional transmission means and is configured to transmit the challenge message in a first predetermined direction then, before submitting the confirmation message to the message store, is further configured to transmit one or more directed repetitions of the challenge message in one or more respective further predetermined directions, and the method further comprises:

the validation device inferring data relating to location, relative to the beacon device at a time the challenge message was issued, of each responder device inferred to have received the challenge message over the respective direct communication link, and the validation device inferring the data relating to the location of each of the one or more responder devices from timings of each response message with respect to times the challenge message and the directed repetitions of the challenge message were transmitted.

2. The method of claim 1, wherein one of the responder devices is co-located with a quantum key distribution (QKD) link terminal or QKD trusted node; and the method further comprises the validation device authenticating that one of the responder devices for participation in QKD based on the inferred data relating to the location of that one of the responder devices relative to the beacon device.

3. The method of claim 1, wherein the challenge message and the directed repetitions of the challenge message are transmitted according to a predetermined temporal and directional pattern; and the method further comprising the validation device:

repeating transmitting of the challenge message and the directed repetitions of the challenge message on one or more subsequent occasions, wherein both contents of the challenge message and the predetermined temporal and directional pattern are varied between occasions; then inferring whether responder devices local to one another have shared data to gain an unfair advantage.

4. The method of claim 1, wherein each response message comprises data intended for the respective recipient device and originating from a respective sender device distinct from the respective responder device; and the method further comprises the validation device validating the data originating from the respective sender device as having been routed via a respective responder device local to the beacon device.

5. The method of claim 1, further comprising the validation device generating an external device challenge message portion and transmitting the external device challenge message portion to the beacon device to cause the beacon device to generate a beacon device challenge message portion and construct the challenge message contents as a non-separable function of two or more variables, the external device challenge message portion and the beacon device challenge message portion each comprising at least one of the variables.

6. The method of claim 1, wherein the challenge message indicates a problem for the responder devices to solve, each response message indicates a respective responder device solution to the problem and the confirmation message indicates one of the problem and a beacon device solution to the problem; and wherein inferring which of the respective responder devices, if any, received the challenge message over the respective direct communication link comprises determining whether each responder device solution is a correct solution to the problem.

7. The method of claim 6, wherein:

the message store is a distributed ledger;

the validation device is one of a plurality of peers which can participate in building the distributed ledger; and the confirmation message indicates the problem; and the method further comprises the validation device:

determining that none of the responder devices received the challenge message over the respective direct communication link; and responsive to determining that none of the responder devices received the challenge message, solving the problem and submitting a resulting validation device solution to the distributed ledger.

8. The method of claim 6, wherein:

the message store is a distributed ledger; and the validation device is one of a plurality of peers which can participate in building the distributed ledger; and the computer-implemented method further comprises the validation device participating in adding an entry to the distributed ledger in respect of only a first solution to the problem submitted to the distributed ledger.

9. The method of claim 1, wherein:

the challenge message is transmitted at a first predetermined signal-to-noise ratio (SNR); and between transmitting the challenge message and the confirmation message, the beacon device is configured to transmit one or more SNR-incremented repetitions of the challenge message at successively higher SNRs;

the computer-implemented method further comprising the validation device inferring data relating to the respective direct communication links from timing of each response message with respect to times the challenge message and the SNR-incremented repetitions of the challenge message were transmitted.

10. The method of claim 1, further comprising the validation device authenticating the one or more responder devices for two-way communication with the beacon device in dependence on timings of the respective response messages.

11. The method of claim 10, wherein authenticating the one or more responder devices for two-way communication with the beacon device in dependence on timings of the respective response messages comprises authenticating any responder device whose response message is before a cut-off time and denying authentication of any other responder devices.

12. The method of claim 10, wherein the beacon device is a network node and authenticating the one or more responder devices for two-way communication with the beacon device in dependence on timings of the respective response messages comprises authenticating the one or more responder devices for network access via the network node.

13. A computer-implemented method performed by a validation device, the computer-implemented method comprising:

following transmission of a challenge message by a beacon device to each of one or more responder devices over a respective direct communication link, the challenge message inviting each of the one or more responder devices to prove an existence of a respective direct communication link by transmitting to a respective recipient device, distinct from the beacon device, a respective response message indicating knowledge of contents of the challenge message;

the validation device obtaining an indication that a confirmation message from the beacon device has been received by a message store, the confirmation message indicating knowledge of the contents of the challenge message and having been transmitted by the beacon device a predetermined time period after transmission of the challenge message;

the validation device, responsive to obtaining the indication, comparing contents of each response message which preceded the confirmation message in time, if any, to contents of the confirmation message and inferring therefrom which of the respective responder devices, if any, received the challenge message over the respective direct communication link;

the validation device authenticating the one or more responder devices for two-way communication with the beacon device in dependence on timings of the respective response messages including authenticating a responder device whose response message was earliest and denying authentication of any other responder devices.

14. A computer-implemented method performed by a beacon device, the method comprising:

the beacon device transmitting a challenge message to each of one or more responder devices over a respective direct communication link, to invite each responder device to prove an existence of the respective direct communication link by transmitting to a respective recipient device, distinct from the beacon device, a respective response message indicating knowledge of contents of the challenge message;

the beacon device, a predetermined time period after transmission of the challenge message, transmitting a confirmation message to a message store, the confirmation message indicating knowledge of the contents of the challenge message such that a validation device can compare contents of each response message which preceded the confirmation message in time to contents of the confirmation message and infer therefrom which of the respective responder devices, if any, received the challenge message over the respective direct communication link;

the beacon device receiving, from a device external to the beacon device, an external device challenge message portion;

responsive thereto, the beacon device generating a beacon device challenge message portion; and responsive thereto, the beacon device constructing the challenge message as a non-separable function of two or more variables, the external device challenge message portion and the beacon device challenge message portion each comprising at least one of the variables, wherein transmitting the challenge message is responsive to constructing the challenge message.

15. The method of claim 14, wherein transmitting the challenge message comprises adding noise to a signal carrying the challenge message.

16. The method of claim 14, wherein the challenge message is transmitted at a first predetermined signal-to-noise ratio (SNR); and the method further comprises the beacon device, between transmitting the challenge message and the confirmation message, transmitting one or more SNR-incremented repetitions of the challenge message at successively higher SNRs, such that data relating to the respective direct communication links can be inferred from timings of each response message with respect to times the challenge message and the SNR-incremented repetitions of the challenge message were transmitted.

17. A computer-implemented method performed by a beacon device, the method comprising:

the beacon device transmitting a challenge message to each of one or more responder devices over a respective direct communication link, to invite each responder device to prove an existence of the respective direct communication link by transmitting to a respective recipient device, distinct from the beacon device, a respective response message indicating knowledge of contents of the challenge message; and the beacon device, a predetermined time period after transmission of the challenge message, transmitting a confirmation message to a message store, the confirmation message indicating knowledge of the contents of the challenge message such that a validation device can compare contents of each response message which preceded the confirmation message in time to contents of the confirmation message and infer therefrom which of the respective responder devices, if any, received the challenge message over the respective direct communication link, wherein the challenge message indicates a problem for the responder devices to solve and the confirmation message indicates one of the problem or a beacon device solution to the problem, and wherein at least one of:

the beacon device determines the time period based on a predicted solving duration for a target solving device;

the beacon device constructs the challenge message so that the problem has a predicted solving duration for a target solving device based on the predetermined time period;

data in the challenge message indicating the problem comprise one or more codes constructed such that a predetermined threshold signal-to-noise ratio (SNR) is required at a responder device for the responder device to successfully decode them;

the problem is dependent on a responder device identifier such that each response message indicates a different responder device solution;

the beacon device constructs the confirmation message such that an outer problem must be solved to obtain the problem from the confirmation message;

transmitting the challenge message comprises transmitting a plurality of temporally-separated challenge message fractions, constructed such that all of the challenge message fractions must be received in order to obtain the problem;

the direct communication links are radio communication links, transmitting the challenge message comprises encoding the challenge message on one or more radio transmissions, the beacon device comprises directional transmission means and transmitting the challenge message comprises transmitting the challenge message in a first predetermined direction, and the method further comprises, before transmitting the confirmation message to the message store, the beacon device transmitting one or more directed repetitions of the challenge message in one or more respective further predetermined directions such that data relating to the location of each of the responder devices can be inferred from timings of each response message with respect to times the challenge message and the directed repetitions of the challenge message were transmitted; or the beacon device, prior to or at the same time as transmitting the challenge message, provides some but not all of the responder devices with an information advantage to assist with solving the problem.

18. The method of claim 17, wherein data in the challenge message indicating the problem comprise one or more codes constructed such that the one or more codes are computationally harder to decode the greater the error rate in the challenge message when received.

19. The method of claim 17, wherein the problem comprises determination of a salt which, when combined with a specified input string via a specified cryptographic hash function, produces an output string comprising a specified string.

20. The method of claim 17, wherein the direct communication links are radio communication links and transmitting the challenge message comprises encoding the challenge message on one or more radio transmissions.

21. The method of claim 17, wherein the challenge message and the directed repetitions of the challenge message are transmitted according to a predetermined temporal and directional pattern; and the method further comprises the beacon device repeating the transmitting of one or more directed repetitions of the challenge message in one or more respective further predetermined directions on one or more subsequent occasions, with contents of the challenge message being varied between occasions, wherein the predetermined temporal and directional pattern is varied between occasions such that any sharing of solutions between responder devices local to one another can be inferred.

22. A computer-implemented method performed by a beacon device, the method comprising:

the beacon device transmitting a challenge message to each of one or more responder devices over a respective direct communication link, to invite each responder device to prove an existence of the respective direct communication link by transmitting to a respective recipient device, distinct from the beacon device, a respective response message indicating knowledge of contents of the challenge message, wherein the direct communication links are optical fiber communication links and transmitting the challenge message comprises encoding the challenge message on an optical signal; and the beacon device, a predetermined time period after transmission of the challenge message, transmitting a confirmation message to a message store, the confirmation message indicating knowledge of the contents of the challenge message such that a validation device can compare contents of each response message which preceded the confirmation message in time to contents of the confirmation message and infer therefrom which of the respective responder devices, if any, received the challenge message over the respective direct communication link, wherein there are a plurality of responder devices and transmitting the challenge message comprises:

encoding the challenge message as a series of qubits or qudits, each qubit or qudit of the series being a weak coherent optical pulse or a single photon, stochastically directing each qubit or qudit of the series to a respective one of the responder devices, and repeating transmission of the series of qubits or qudits in this way, such that responder devices can decode the complete challenge message after multiple repetitions.

23. A computer-implemented method performed by a beacon device, the method comprising:

the beacon device transmitting a challenge message to each of one or more responder devices over a respective direct communication link, to invite each responder device to prove an existence of the respective direct communication link by transmitting to a respective recipient device, distinct from the beacon device, a respective response message indicating knowledge of contents of the challenge message;

the beacon device, a predetermined time period after transmission of the challenge message, transmitting a confirmation message to a message store, the confirmation message indicating knowledge of the contents of the challenge message such that a validation device can compare contents of each response message which preceded the confirmation message in time to contents of the confirmation message and infer therefrom which of the respective responder devices, if any, received the challenge message over the respective direct communication link; and the beacon device either engaging in or eschewing subsequent two-way communication with each of the one or more responder devices over the respective direct communication link, in dependence on the existence and the timing of a respective response message.

24. The method of claim 23, wherein either engaging in or eschewing subsequent two-way communication with each of the one or more responder devices comprises engaging in subsequent two-way communication with a responder device whose response message was earliest and eschewing subsequent two-way communication with other responder devices.

25. The method of claim 23, wherein either engaging in or eschewing subsequent two-way communication with each of the one or more responder devices comprises engaging in subsequent two-way communication with any responder device whose response message is before a cut-off time and eschewing subsequent two-way communication with other responder devices.

26. The method of claim 23, wherein the beacon device is a network node and either engaging in or eschewing subsequent two-way communication with each of the one or more responder devices comprises respectively providing or denying network access to each of the one or more responder devices.

27. A computer-implemented method performed by a responder device, the method comprising:

the responder device receiving a challenge message comprising a beacon device problem portion from a beacon device over a direct communication link, the challenge message inviting the responder device to prove an existence of that direct communication link by transmitting to a recipient device a response message indicating knowledge of the challenge message;

the responder device receiving, from a device external to the beacon device, over a further direct communication link, an external device problem portion message comprising an external device problem portion, the external device problem portion message inviting the responder device to prove the existence of the further direct communication link by transmitting to the recipient device a response message indicating knowledge of the external device problem portion message;

the responder device solving a problem constructed as a non-separable function of two or more variables, the external device problem portion and the beacon device problem portion each comprising at least one of the variables; and the responder device transmitting a response message comprising a solution to the problem, such that the responder device can be validated as having direct communication links with both the beacon device and the external device by:

comparing contents of the response message to contents of:

a confirmation message transmitted by the beacon device indicating knowledge of the contents of the challenge message, the confirmation message having been transmitted by the beacon device to a message store a predetermined time period after transmission of the challenge message; and a further confirmation message transmitted by the external device indicating knowledge of the external device problem portion, the further confirmation message having been transmitted by the external device to a further message store a predetermined time period after transmission of the external device problem portion message; and inferring that:

the responder device received the challenge message over the direct communication link; and the responder device received the external device problem portion over the further direct communication link.

28. A data processing system configured to perform the computer-implemented method of claim 1.

29. A computer program comprising instructions which, when the program is executed by a computer, cause the computer to carry out the computer-implemented method of claim 1.

30. A computer-readable data carrier having stored thereon the computer program of claim 29.

* * * * *